(12) United States Patent
Huffer et al.

(10) Patent No.: US 11,890,533 B2
(45) Date of Patent: Feb. 6, 2024

(54) ERGONOMIC GAME CONTROLLER AND SYSTEM

(71) Applicant: HIT BOX, L.L.C., Henderson, NV (US)

(72) Inventors: Dustin Lee Huffer, Henderson, NV (US); Shawn Huffer, Henderson, NV (US)

(73) Assignee: HIT BOX, L.L.C., Las Vegas, NV (US)

( * ) Notice: Subject to any disclaimer, the term of this patent is extended or adjusted under 35 U.S.C. 154(b) by 0 days.

(21) Appl. No.: 17/286,029

(22) PCT Filed: Oct. 18, 2019

(86) PCT No.: PCT/US2019/056952
§ 371 (c)(1),
(2) Date: Apr. 16, 2021

(87) PCT Pub. No.: WO2020/081943
PCT Pub. Date: Apr. 23, 2020

(65) Prior Publication Data
US 2021/0379487 A1    Dec. 9, 2021

Related U.S. Application Data

(60) Provisional application No. 62/748,346, filed on Oct. 19, 2018, provisional application No. 62/747,931, filed on Oct. 19, 2018.

(51) Int. Cl.
*A63F 13/24*    (2014.01)
(52) U.S. Cl.
CPC .................................. *A63F 13/24* (2014.09)
(58) Field of Classification Search
CPC ....................................................... A63F 13/24
See application file for complete search history.

(56) References Cited

U.S. PATENT DOCUMENTS

| 4,067,431 A | 1/1978 | Whitaker |
| 4,333,097 A | 6/1982 | Buric et al. |

(Continued)

FOREIGN PATENT DOCUMENTS

| AU | 2017100317 A4 | 4/2017 |
| DE | 20 2018 101 524 U1 | 6/2018 |

(Continued)

OTHER PUBLICATIONS

Hit Box Smash Box—Video Game Controller for Smash Bros by Dustin Huffer—Kickstarter, https://www.kickstarter.com/projects/2099087376/hit-box-smash-box-video-game-controller-for-smash, obtained on Apr. 16, 2021.

(Continued)

*Primary Examiner* — Omkar A Deodhar
*Assistant Examiner* — Shauna-Kay Hall
(74) *Attorney, Agent, or Firm* — DICKINSON WRIGHT PLLC

(57) ABSTRACT

A gaming controller includes a series of button assemblages corresponding to various game input functions. The assemblages are angled such that an operator's fingers are aligned with buttons resulting minimal tilting of the wrist. The gaming controller includes modifier buttons that change the strength of corresponding button input. A controller operating system includes a controller circuit with a processor configured to perform various functionalities. The operating system further includes a plurality of settings and sub-settings, at least some of which being related to user profiles, modifier button settings, and/or override systems. A method includes connecting the gaming controller to a video monitor and changing at least one setting associated with at least one of a user profile, a modifier button, and an override system that is saved on a local memory.

18 Claims, 40 Drawing Sheets

(56) References Cited

U.S. PATENT DOCUMENTS

| | | | |
|---|---|---|---|
| 4,891,777 A | 1/1990 | Lapeyre | |
| 5,059,958 A * | 10/1991 | Jacobs | G06F 3/0338 345/158 |
| 5,087,910 A * | 2/1992 | Guyot-Sionnest | H01H 13/807 345/169 |
| 5,500,643 A | 3/1996 | Grant | |
| 5,551,701 A * | 9/1996 | Bouton | G06F 12/0653 345/161 |
| 5,900,864 A * | 5/1999 | Macdonald | G06F 3/0235 345/169 |
| 5,923,317 A | 7/1999 | Sayler | |
| 6,164,853 A | 12/2000 | Foote | |
| 6,512,511 B2 | 1/2003 | Willner et al. | |
| 6,760,013 B2 | 7/2004 | Willner et al. | |
| 7,116,310 B1 * | 10/2006 | Evans | A63F 13/22 345/169 |
| 10,022,623 B2 | 7/2018 | Huffer et al. | |
| 2001/0003713 A1 * | 6/2001 | Willner | G06F 3/0219 348/E5.103 |
| 2004/0176166 A1 | 9/2004 | Siegel | |
| 2004/0224765 A1 | 11/2004 | Martinez et al. | |
| 2005/0093846 A1 * | 5/2005 | Marcus | G06F 3/04886 345/184 |
| 2005/0132014 A1 * | 6/2005 | Horvitz | G06Q 30/02 709/206 |
| 2005/0225530 A1 * | 10/2005 | Evans | A63F 13/06 345/156 |
| 2005/0239524 A1 | 10/2005 | Longman et al. | |
| 2006/0007159 A1 | 1/2006 | Lane et al. | |
| 2006/0097453 A1 * | 5/2006 | Feldman | A63F 13/22 273/304 |
| 2006/0154725 A1 * | 7/2006 | Glaser | G07F 17/32 463/37 |
| 2007/0060393 A1 | 3/2007 | Wu | |
| 2007/0066394 A1 | 3/2007 | Ikeda et al. | |
| 2007/0256913 A1 | 11/2007 | Wee et al. | |
| 2008/0001786 A1 * | 1/2008 | Lutnick | G06F 3/0238 341/22 |
| 2008/0080789 A1 * | 4/2008 | Marks | A63F 13/42 345/161 |
| 2008/0100825 A1 * | 5/2008 | Zalewski | A63F 13/42 356/28 |
| 2008/0303698 A1 | 12/2008 | Casparian et al. | |
| 2009/0005138 A1 * | 1/2009 | Stamper | A63F 13/34 463/1 |
| 2009/0048018 A1 * | 2/2009 | Sayyadi | A63F 13/5255 463/32 |
| 2010/0009746 A1 * | 1/2010 | Raymond | A63F 13/428 463/31 |
| 2010/0045490 A1 | 2/2010 | Odell et al. | |
| 2010/0075756 A1 | 3/2010 | Roberts et al. | |
| 2011/0009195 A1 * | 1/2011 | Porwal | A63F 13/533 463/37 |
| 2011/0134048 A1 * | 6/2011 | Walline | G06F 3/03547 345/173 |
| 2011/0136568 A1 * | 6/2011 | Buhr | A63F 13/22 463/37 |
| 2014/0101343 A1 * | 4/2014 | Townsend | A63F 13/23 710/14 |
| 2014/0357372 A1 * | 12/2014 | Garcia | A63F 13/79 463/37 |
| 2016/0193528 A1 * | 7/2016 | Ikenaga | A63F 13/22 463/36 |
| 2018/0267771 A1 * | 9/2018 | Wiggemans | A63F 13/235 |

FOREIGN PATENT DOCUMENTS

| | | |
|---|---|---|
| WO | 2004058368 A1 | 7/2004 |
| WO | 2018053357 A1 | 3/2018 |

OTHER PUBLICATIONS

International Search Report and Written Opinion corresponding to PCT/US2019/056952 dated Jan. 27, 2020.

Hit Box Smash Box—Video Game Controller for Smash Bros by Dustin Huffer—Kickstarter, Dustin Huffer, Web page, 19 pages, Mar. 29, 2017, retrieved from Internet Archive Wayback Machine.

Microsoft unveils new $150 Xbox One Elite controller—and we've held it, Sam Machkovech, Web page, 5 pages, Jun. 15, 2015, retrieved from Internet Archive Wayback Machine on Apr. 14, 2022.

ALL Controller | Universal & Fully Customizable by Digital Depth Inc.—Kickstarter, Digital Depth Inc., Web page, 19 pages, Aug. 7, 2017, retrieved from Internet Archive Wayback Machine on Apr. 14, 2022.

First Examination Report regarding corresponding EP App. No. 19 798 821.5; dated Oct. 6, 2022.

Communication pursuant to Article 94(3) EPC regarding corresponding EP App. No. 19 798 821.5; dated Aug. 28, 2023.

* cited by examiner

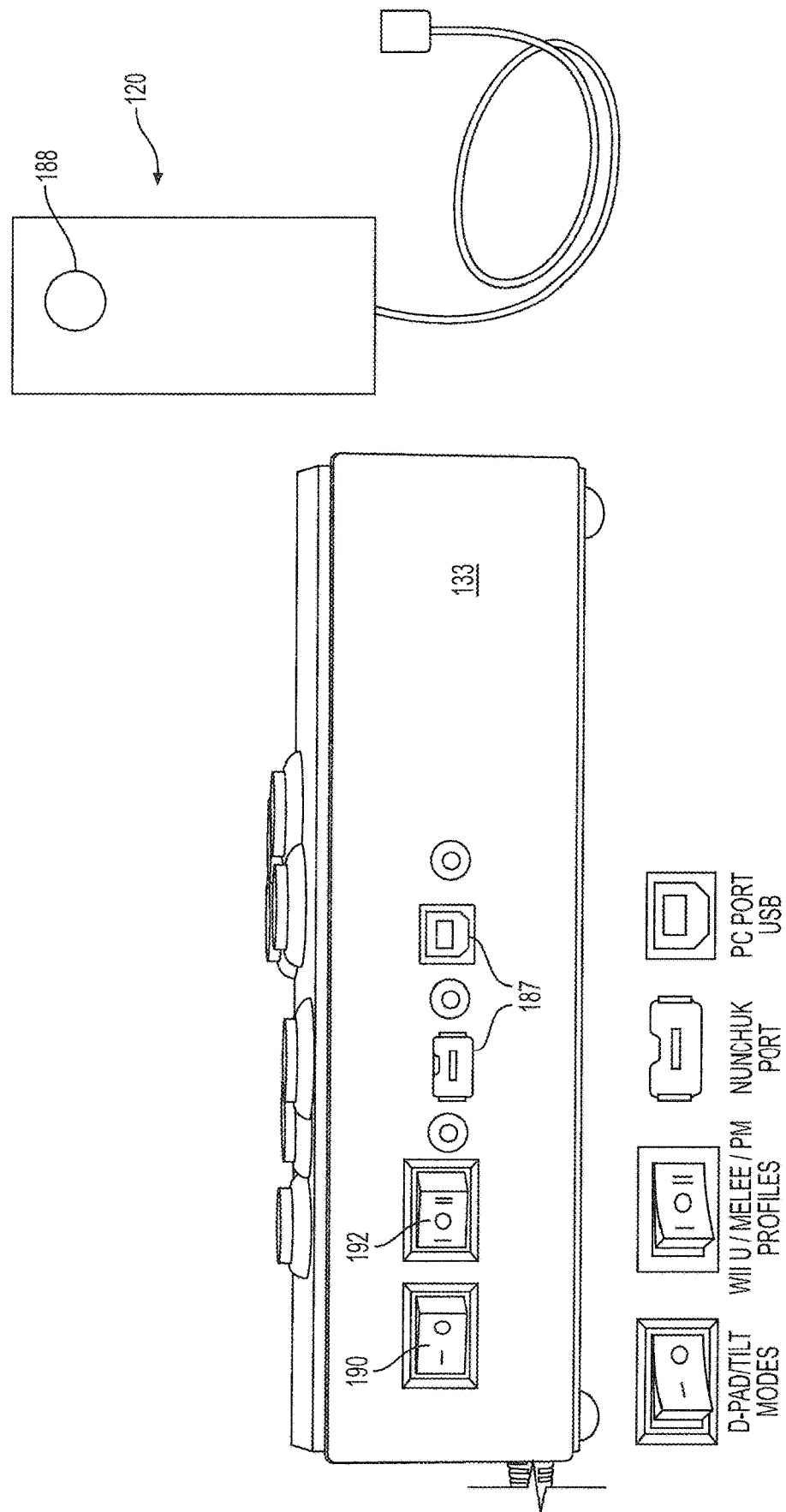

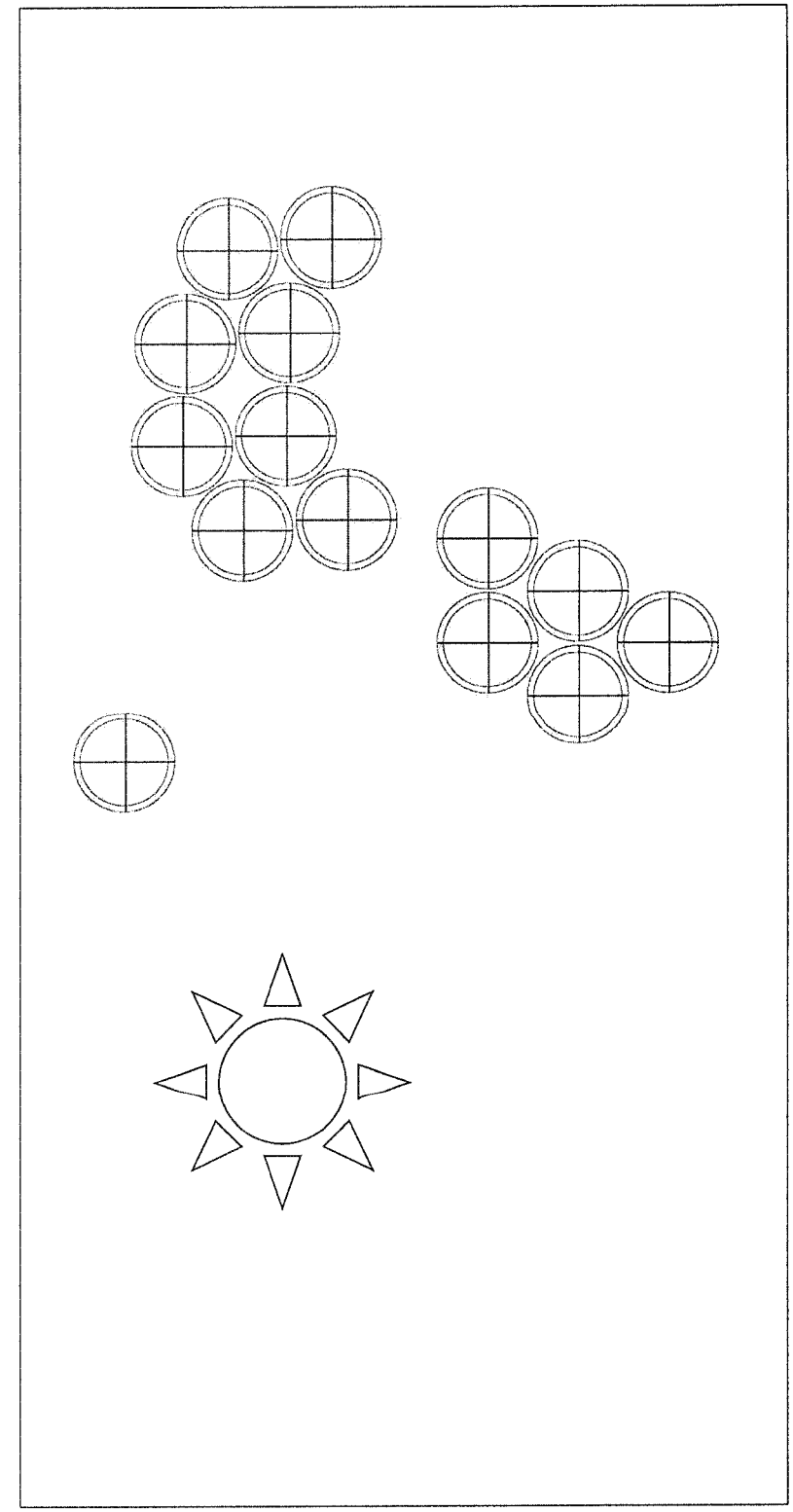

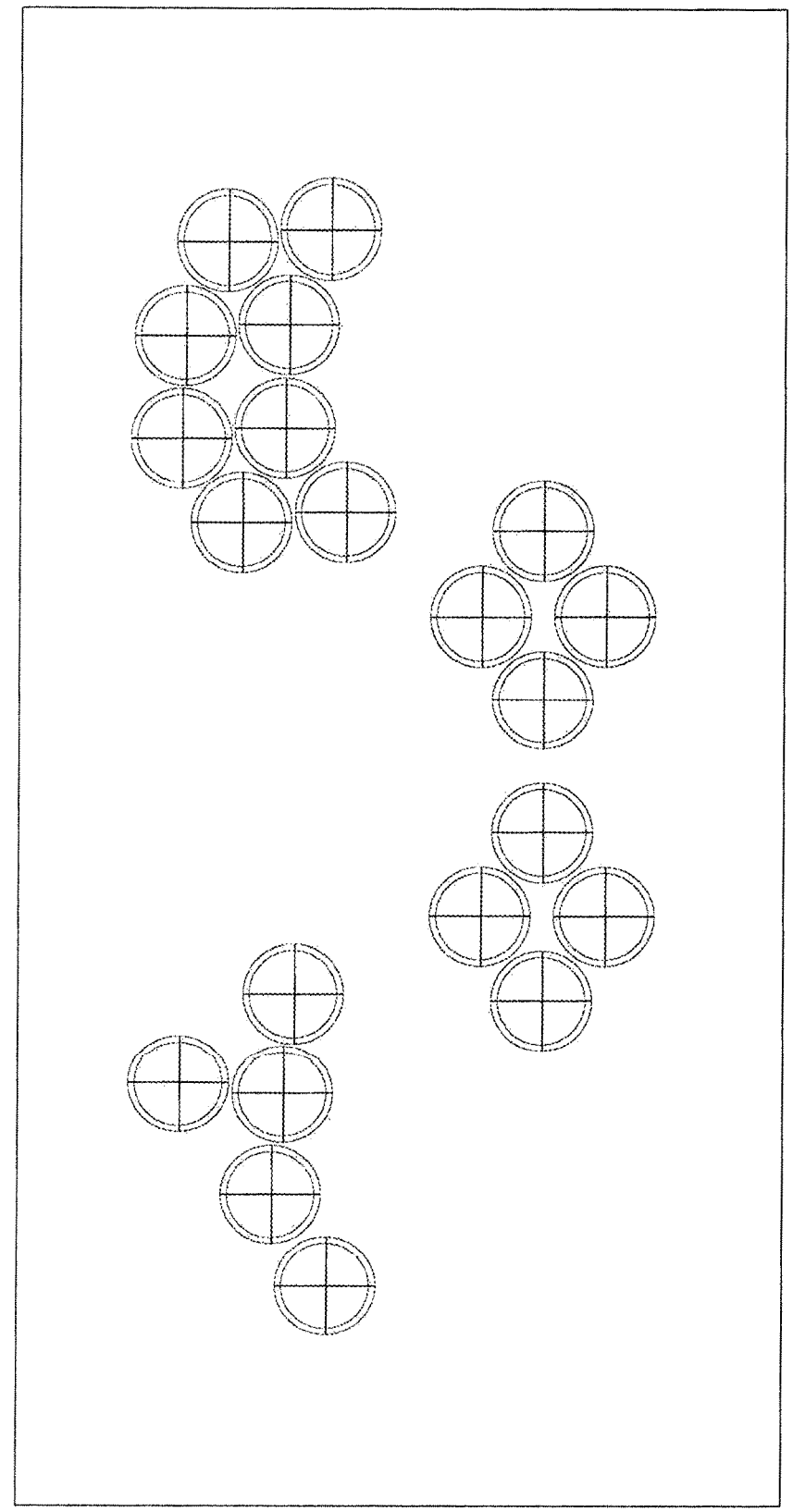

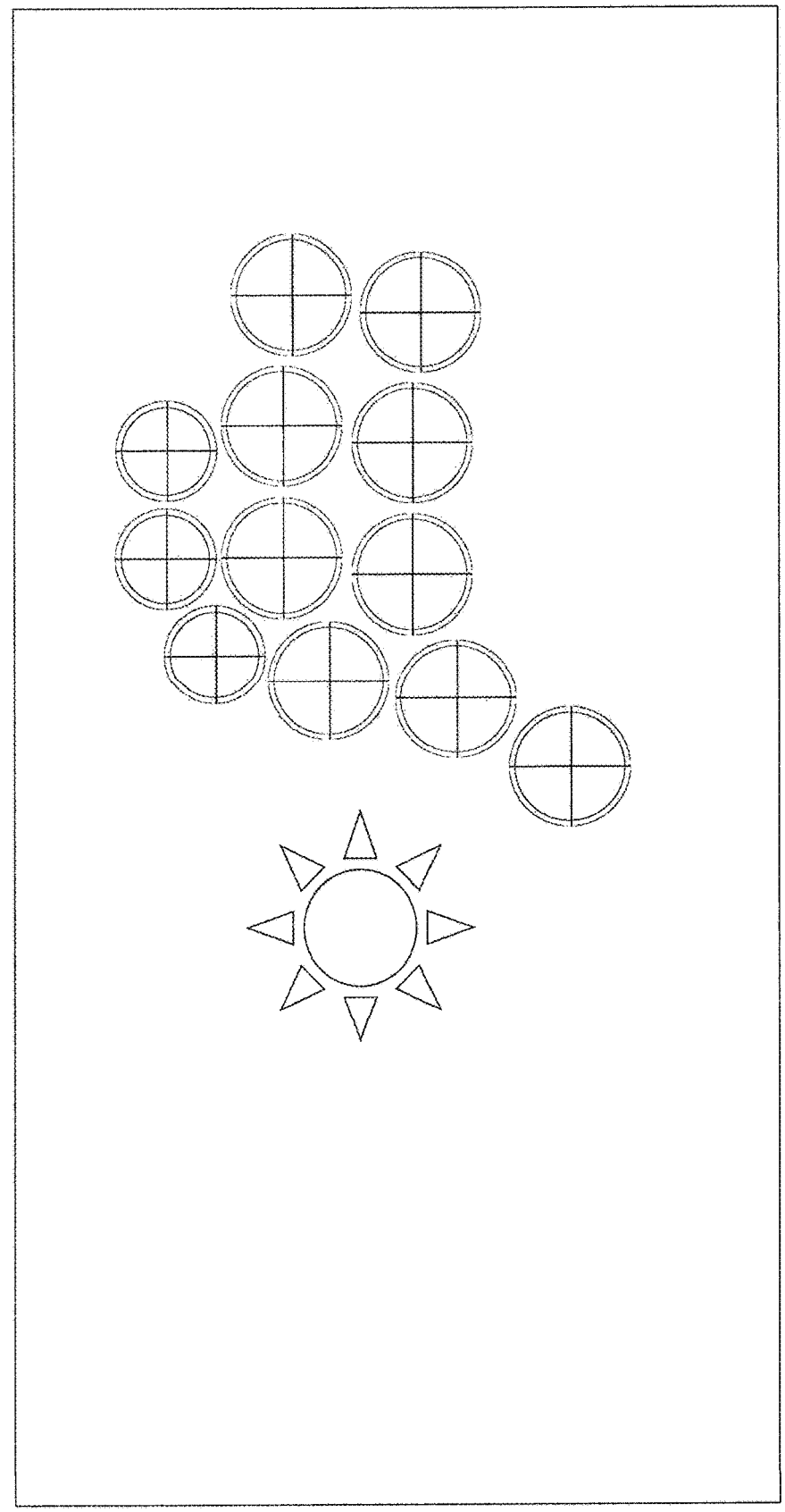

ERGONOMIC GAME CONTROLLER AND SYSTEM

CROSS-REFERENCE TO RELATED APPLICATIONS

This U.S. National Stage Patent Application claims the benefit of PCT International Patent Application Serial No. PCT/US2019/056952 filed Oct. 18, 2019 entitled "Ergonomic Game Controller and System" which claims the benefit of and priority to U.S. Provisional Patent Application Ser. No. 62/747,931 filed on Oct. 19, 2018, titled "Ergonomic Game Controller and System," and further claims the benefit of and priority to U.S. Provisional Patent Application Ser. No. 62/748,346 filed on Oct. 19, 2018, titled "Ergonomic Game Controller and System," the entire disclosures of which are hereby incorporated by reference.

BACKGROUND OF THE INVENTION

1. Field of the Invention

The present invention relates to a game controller for providing input to a gaming device. More particularly, the present invention relates a game controller and system of operation with improved ergonomics and functionality.

2. Related Art

This section provides background information related to the present disclosure which is not necessarily prior art.

Games are one of the favorite past times of both young and old. Pinball machines were one of the first devices to introduce players to new and exciting gaming mechanics. Historically, the increasing popularity of pinball machines resulted in commercial opportunities for entrepreneurs, which began to install pinball machines in public businesses. The realized commercial opportunity gave rise to the first arcades. Pinball machines have considerably developed from purely mechanical devices to electromechanical and more recently purely electric variations. In addition to modernized pinball machines, new types of arcade gaming devices were introduced into the mainstream. These new devices took advantage of technological improvements and generally evolved to include a housing having a video screen, which displayed various characters and objects regulated via a controller. Arcade controllers have typically included only buttons and joysticks in various shapes and sizes but have also developed to include moveable elements having internal sensors such that movement of the element is registered and relayed on the video screen.

As with many activities which become recreationally popular, the popularity of arcade games bred competition among players to achieve higher and higher scores. This desire to achieve the highest score required longer play times and often results in hand and wrist problems like carpal tunnel syndrome and other repetitive strain injuries.

Gaming consoles offer a similar experience to users but allow them to play from home. Like arcade machines, gaming consoles are ever evolving to offer cutting edge technology that generally improves user experience. The improvements in modern video game consoles has ultimately resulted in arcades becoming less and less popular. However, the competitive aspect of gaming is now more popular than ever particularly as users can now play games with other players online in regionally or globally ranked tournaments.

Depending on the gaming console, different types of controllers are used. Even more specifically, individual gaming consoles offer multiple types of compatible controllers that offer certain advantages to specific types of games. Recently, arcade-style controllers have experienced a resurgence, becoming particularly popular to gaming purists and competitors. These arcade-style controllers do offer some advantages over conventional controllers but still suffer multiple drawbacks such as ergonomics, technological compatibility, and suited idiosyncratic settings.

Accordingly, there is a continuing desire to develop controllers and related operation systems that are ergonomic and provide improved functionality.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

According to one aspect of the disclosure, a gaming controller system is presented. The gaming controller system comprising a gaming controller having a surface including a plurality of buttons corresponding to in-game inputs, a local memory located within the gaming controller and having machine readable non-transitory storage including a profile data that modifies the in-game input, and a processor located within the gaming controller and configured to read the non-transitory storage in view of the profile data to modify the in-game inputs.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 3 is a side view of the gaming controller illustrating buttons along a peripheral edge;

DESCRIPTION OF THE ENABLING EMBODIMENT

Example embodiments will now be described more fully with reference to the accompanying drawings. In general, the subject embodiments are directed to a gaming controller and operating system. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the gaming controller and system of operation is intended for increasing improving ergonomics and functionality of arcade-style gaming controllers. As it will be appreciated with further reading, the improved ergonomics of the present invention reduces the muscle and tendon injuries associated with gaming. Moreover, the gaming controller and system of operation provides an improved functionality and compatibility with both technology and personal gaming preferences.

Figure 1B:
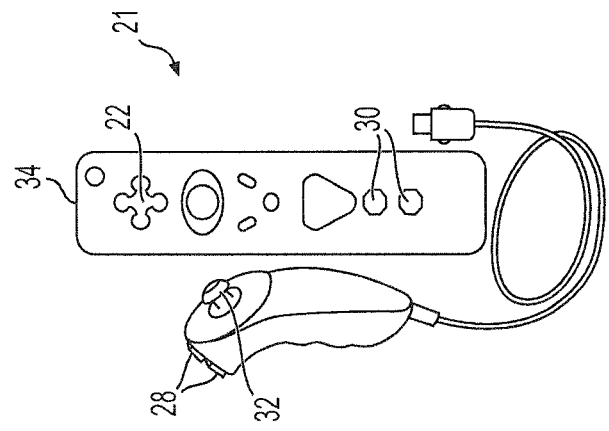
FIGS. 1A and 1B are plan views of conventional prior art gaming console controllers.
Figure 1A:
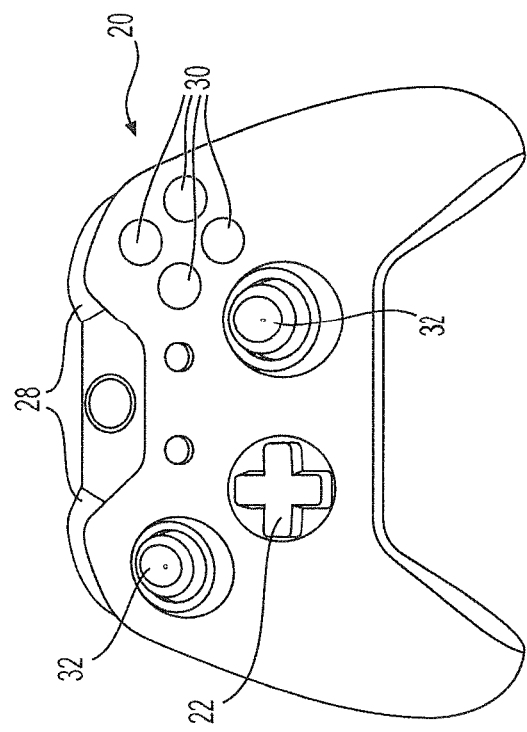
Figure 2A:
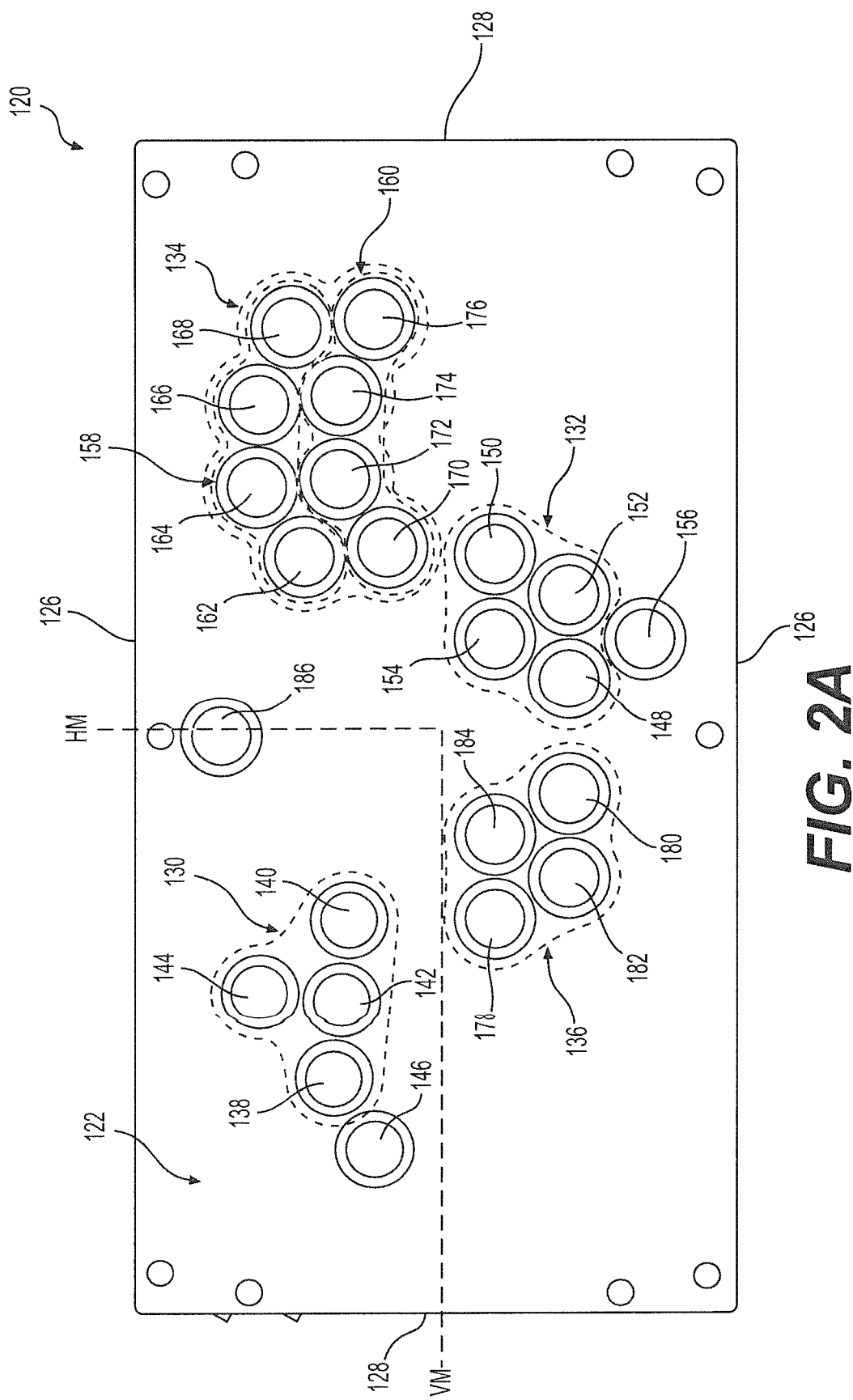
FIG. 2A is a top plan view of a gaming controller according to one aspect of the present invention.

A few example conventional game console controllers 20, 21 are shown in FIGS. 1A and 1B. Although these controllers look different there are a number of similarities in there and most other conventional controllers. For example, each controller 20, 21 includes a control pad 22 with four directional buttons corresponding to left, right, up, and down. Each controller 20, 21 further includes at least two trigger buttons 28 (but typically four) and at least two action buttons 30 (but typically four). In addition, each controller 20, 21 includes a joystick 32. However, the controller 20 in FIG. 1A includes two joysticks 32, wherein to the controller 21 in FIG. 1B only includes one joystick 32. Instead of a second joystick, the controller 21 in FIG. 1B includes a sensor 34 wherein movement of the sensor is registered as an input. While provided as examples, these game console controllers 20, 21, particularly the controller 20, include similar button arrangements and functionality to most other conventional gaming controllers A plan view of the gaming controller 120 in accordance the present disclosure is shown in FIG. 2. The gaming controller 120 defines a generally rectangular shape having a top surface 122 and bottom surface 124 (FIG. 3) spaced apart by a pair of horizontal or longitudinal walls 126 and vertical or transverse walls 128, The longitudinal walls 126 define a horizontal midpoint HM of the gaming controller 120 and the transverse walls 128 define a vertical midpoint VM of the gaming controller 120. In accordance with one arrangement of the present disclosure, the gaming controller 120 includes a first assemblage of buttons 130 that generally corresponds to the first joystick of the prior art controllers 20, 21 and a second assemblage of buttons 132 that generally corresponds to the second joystick (or sensor) of the prior art controllers 20, 21. The gaming controller 120 further includes a third assemblage of buttons 134 corresponding to a combination of triggers 28 and action buttons 30 of the prior art controllers 20, 21. One object of the present invention is to provide a large range of switchable settings to streamline personal playstyles and preferences. As such, there is a fourth assemblage of buttons 136 that modify aspects of the other buttons. In preferred embodiment and described in greater detail below, the fourth assemblage of buttons 136 preferably modifies the first assemblage of buttons 130 and/or the second assemblage of buttons 132, which generally correspond to character/object movement that has historically been accomplished with a joystick or a D-pad. By-way of background, joysticks typically provide more inputs than simply digital readings on up, down, left, and right inputs, instead, they provide an analog system that includes a wide range of diagonal inputs and tilt inputs. The tilt input is a measure of strength input, the more the joystick tilts, greater the in-game response for certain video games. For example, a full tilt right may correspond with a character running right on screen, whereas a half tilt right may correspond with the character walking. More than just a half tilt and full tilt, intermediate levels of tilt can also provide unique in-game outcomes. The magnitude of tilt is derived from the predefined "center point" of the joystick, wherein the distance from the center point corresponds to a value of output. The value of output may be provided as a voltage value numeral from any number of large ranges, such as 0-225 wherein there are at least 225 potential values across the X-axis, the Y-axis, corresponding to even more values when diagonally held. As such, the modifier functions of the fourth assemblage of buttons 136 may provide one or more preselected "tilt" values in the buttons. In other words, the modifier provides the ability to assign each cardinal direction to a different specific analog point. For example, the cardinal left movement may be selected to be 75% tilt base, wherein becomes 45% tilt upon corresponding input of the modifier. Triggers likewise usually calibrate "0" as its constant center point that can be changed with a modifier if preselected in a player profile as will be described in greater detail below. Specific buttons of each assemblage will now be described in greater detail. It is preferable that all the buttons are arcade-style buttons, for example, Sanwa buttons.

Still referring the example layout presented in FIG. 2, the first assemblage of buttons 130 includes four movement buttons (and/or analog directional buttons) including a left movement button 138, a right movement button 140, an up movement button 142, and a down movement button 144. Adjacent to the first assemblage of buttons 130 is an override modifier button 146. The override modifier button 146 is set to correspond to either of the afore described "half tilt" and "full tilt" settings. When override modifier button 146 is set to a "half tilt" setting and held in combination any of the four movement buttons, the on screen object movement is slower than when the button is not held. Oppositely, when override modifier button 146 is set to a "full tilt" setting and held in combination any of the four movement buttons, the on screen object movement is faster than when the button is not held.

The second assemblage of buttons 132 preferably corresponds to the left joystick of the conventional controllers 20, 21. The second assemblage of buttons 132 includes four second movement buttons (and/or analog directional buttons) corresponding to a right joystick including a second left movement button 148, a second right movement button 150, a second up movement button 152, and a second down movement button 154. Adjacent to the first assemblage of buttons 132 is a second override modifier button 156. The second override modifier button 156 functions similarly to the first override modifier button 146 and can be set to correspond to either of the afore described "half tilt" and "full tilt" settings that directly affect the strength of the second assemblage of buttons 132.

The third assemblage of buttons 134 includes a first group of action buttons 158 and a second group of action buttons 160. The first group of action buttons 158 preferably corresponds the trigger buttons of conventional controllers 20. The first group of action buttons 158 comprises four trigger buttons including a first trigger button 162, a second trigger button 164, a third trigger button 166, and a fourth trigger button 168. The second group of action buttons 160 preferably corresponds to the action buttons of conventional controllers 20. The second group of action buttons 160 comprises four action buttons including a first action button 170, a second action button 172, a third action button 174, and a fourth action button 176. However, these and other buttons may be remapped in other arrangements to be any combination of triggers, modifiers, action buttons, and movement buttons.

The fourth assemblage of buttons 136 preferably modifies the first assemblage of buttons 130 and/or the second assemblage of buttons 132 and includes four modifier buttons. The four modifier buttons includes a first modifier button 178, a second modifier button 180, a third modifier button 182, and a fourth modifier button 184. In one preferred arrangement, the first modifier button 178 changes the corresponding tilt of the left movement button 138 and/or second left movement button 148. The second modifier button 180 changes the corresponding tilt of the right movement button 140 and/or the second right movement button 150. The third modifier button 182 changes the corresponding tilt of the up movement button 142 and/or the second up movement button 152. The fourth modifier button 184 changes the corresponding tilt of the down movement button 144 and/or and a second down movement button 154. In an alternative setting or player profile, the first modifier button 178, the second modifier button 180, the third modifier button 182, and the fourth modifier button 184 can correspond to X and Y axis modification. For example, the first modifier button 178 and the second modifier button 180 can correspond to modifying tilt strength in the X-axis and the third modifier button 182 and the fourth modifier button 184 can correspond to the Y-axis tilt strength. Likewise, one or more modifiers may affect X and Y tilt strength simultaneously. In addition, one or more modifiers may change the movement buttons between a base analog setting (no tilt to somewhere between 1-254 value) to digital (full tilt or no tilt).

In addition to the afore described buttons, a menu button 186 is also disposed on the top surface 122 of the gaming controller 120. The menu button 186 functions similarly to start or menu buttons typically used in conventional controllers 20, 21 and once selected can be operated via the same or other buttons.

Figure 2B:
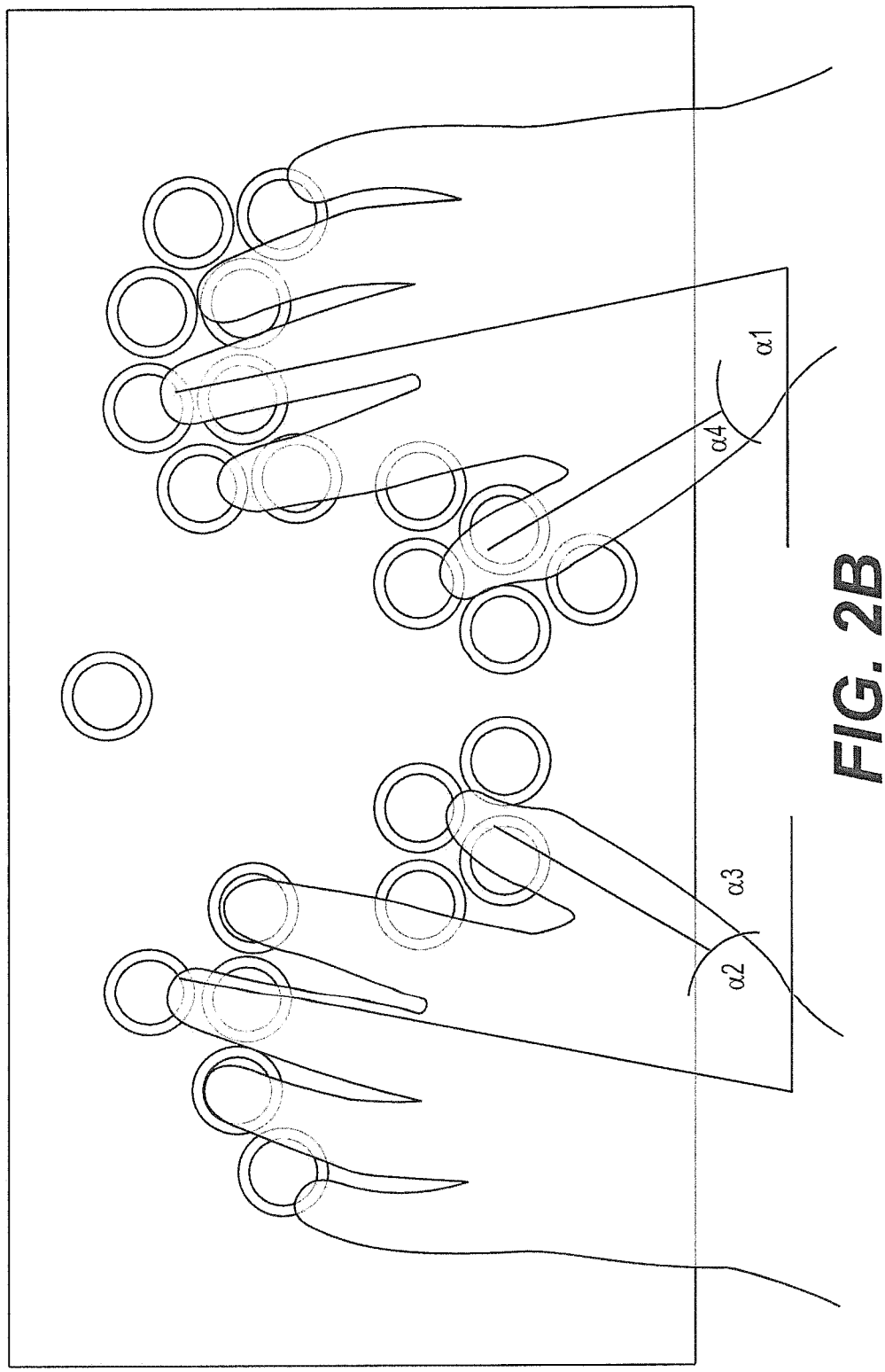
FIG. 2B is a top plan view illustrating a preferable manner of holding a user's hand on the gaming controller in FIG. 2A.

It is one object of the invention that the gaming controller 120 include a layout that corresponds to a human hand. A human hand is shown in FIG. 2B to illustrate the ergonomics of the gaming controller 120. When the average human hand is relaxed, it includes, as measured from the wrist, a pinky extending the shortest distance, an index finger extending the next shortest distance, a ring finger extending a longer distance than the index finger, and a middle finger extending the longest distance. Moreover, when relaxed, the joints between, the distal, middle, and proximal phalanges are slightly bent. It should be appreciated that the buttons on the left side of the vertical midpoint are generally operated with a user's left hand while the buttons on the right side of the vertical midpoint are generally operated with a user's right hand. When the button assemblages on the left side are spaced closely to the buttons assemblages on the right side, the button assemblages are slightly angled at an angle α to correspond to a wrist to elbow angle to prevent a tilting of the wrist. In other words, the closer the left and right assemblages (and hands during use), the further a user's elbows need to be for the hands to be disposed over each assemblage. As such, the closer the left side buttons are to the right side buttons the greater the angle α of assemblages. Preferably, the right side angle α1 is equal and opposite to the left side angle α2. It is also preferable that the relative angles α1, α2 are angled towards the VM and are within 45° of each other, more preferably within 30° of each other, and more preferably yet within 25° of each other. It should also be appreciated that the first assemblage of buttons 130 and the third assemblage of buttons 134 are intended to be preferably operated with the left hand fingers and the right hand fingers, respectively. In addition, the second assemblage of buttons 132 and the fourth assemblage of buttons 136 are intended to be preferably operated with the right hand thumb and the left hand thumb, respectively. As such, vertically adjacent buttons in each assemblage correspond to the angle of the phalanges of the fingers and are preferably spaced such that an adjacently lower phalange sits on an adjacently lower button while inputting the adjacently higher buttons with distal phalanges. As illustrated, the average relaxed thumb extends at angles α3, α4 from the extension of the wrist. During play, movement of the hand (particularly the right hand between action button sub-assemblages) will naturally be along the angles α.

Looking now to FIG. 3, the gaming controller 120 is shown from side view. One of the vertical transverse walls 128 includes a series of ports 187 for electrically connecting the gaming controller 120 to several different devices, including but not limited to: a USB, a computer, gaming console, a joystick 188 such as a nunchuck in FIG. 1B (or any other digital or analog joystick such as a Sanwa JLF Joystick), a wireless relay device, movement sensors, a mouse, other conventional gaming controllers, foot pedals, dance pads, and other inputs. In addition, the game controller 120 may also include internal wireless communication devices (see FIG. 4) such as Bluetooth, cellular, radio, and other forms of a wireless networking. A first setting switch 190 and a second setting switch 192 (shown as toggle switches) are also presented along the vertical transverse wall 128. The first setting switch 190 and a second setting switch 192 will be described in greater detail below but ultimately allow for separate profiles and modifies for multiple players or specific preferences for individual games to be saved within the controller 120. The setting switches 190, 192 can change the keyboard configurations, the modification button settings (button correspondence and ranges), the tilt settings and ranges, and other settings. The switches can be used to select D-pad or modifier input, i.e., digital inputs bound to an analog bind. This is particularly useful for older games that only recognize digital inputs. While not limited thereto these switches can also change the function of 136 buttons (178, 180, 182, 184) back and forth between D-pad 22 function and modifiers. Preferably one switch corresponds to switching between the digital "D-Pad" or analog "Tilt" mode and the other switch corresponds to button remapping, however, other preferences may be saved. In the present embodiment, each switch includes three settings (toggle left, toggle right, and non-toggle) that can be used in combination with settings of the other switch. It should be appreciated however, that there be more than two switches 190, 192. Likewise, it should also be appreciated that the switches could be replaced with dials having any number of settings, for example over three settings, over five settings, or over ten settings. Further, the game controller may include one or more sensors 133, such as infrared, or other sensors such that movement of the gaming controller 120 corresponds to movement on screen.

Figure 4:
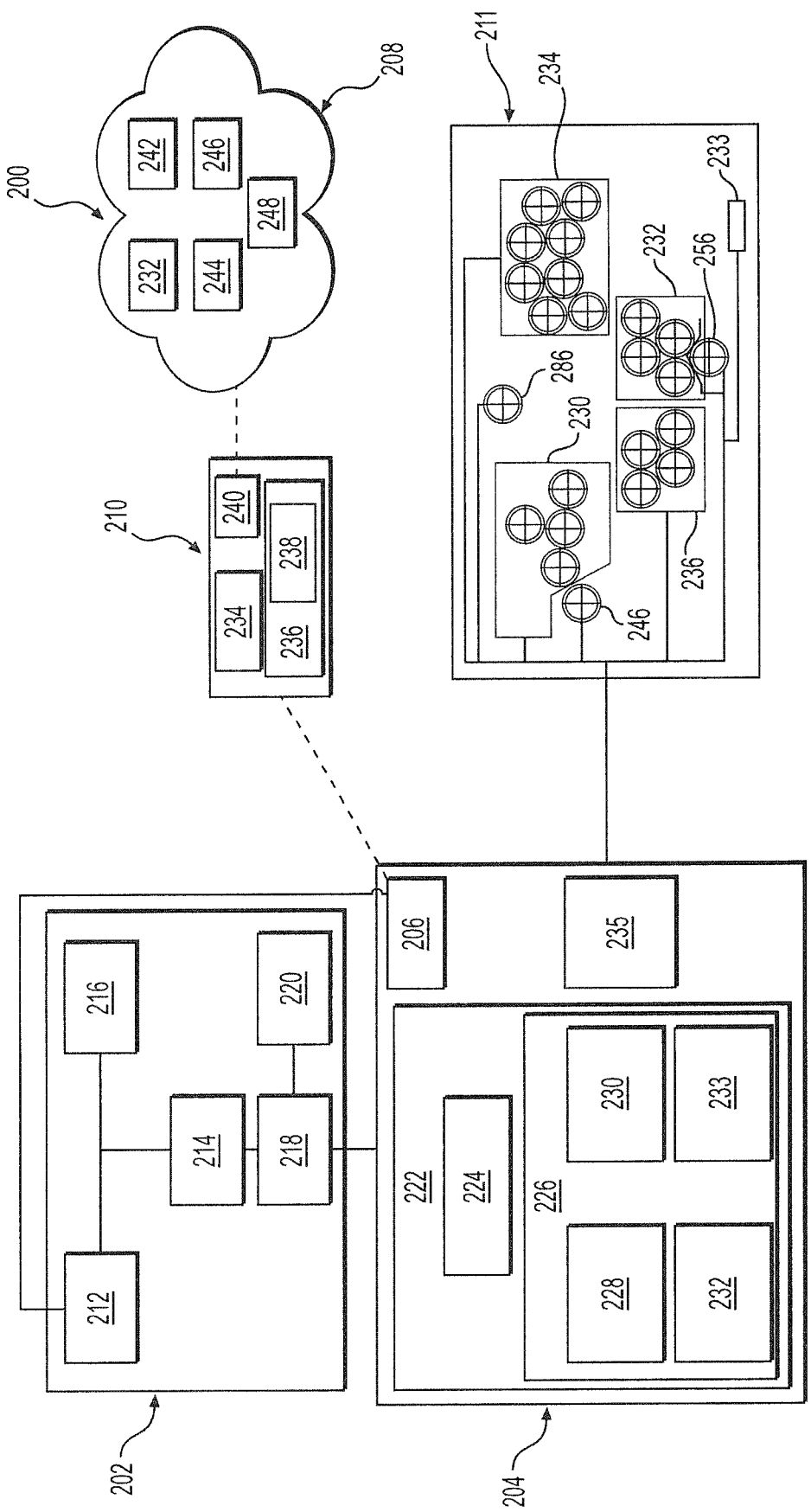
FIG. 4 is a schematic view of a controller circuit facilitating functionality of the gaming controller.
Figure 5:
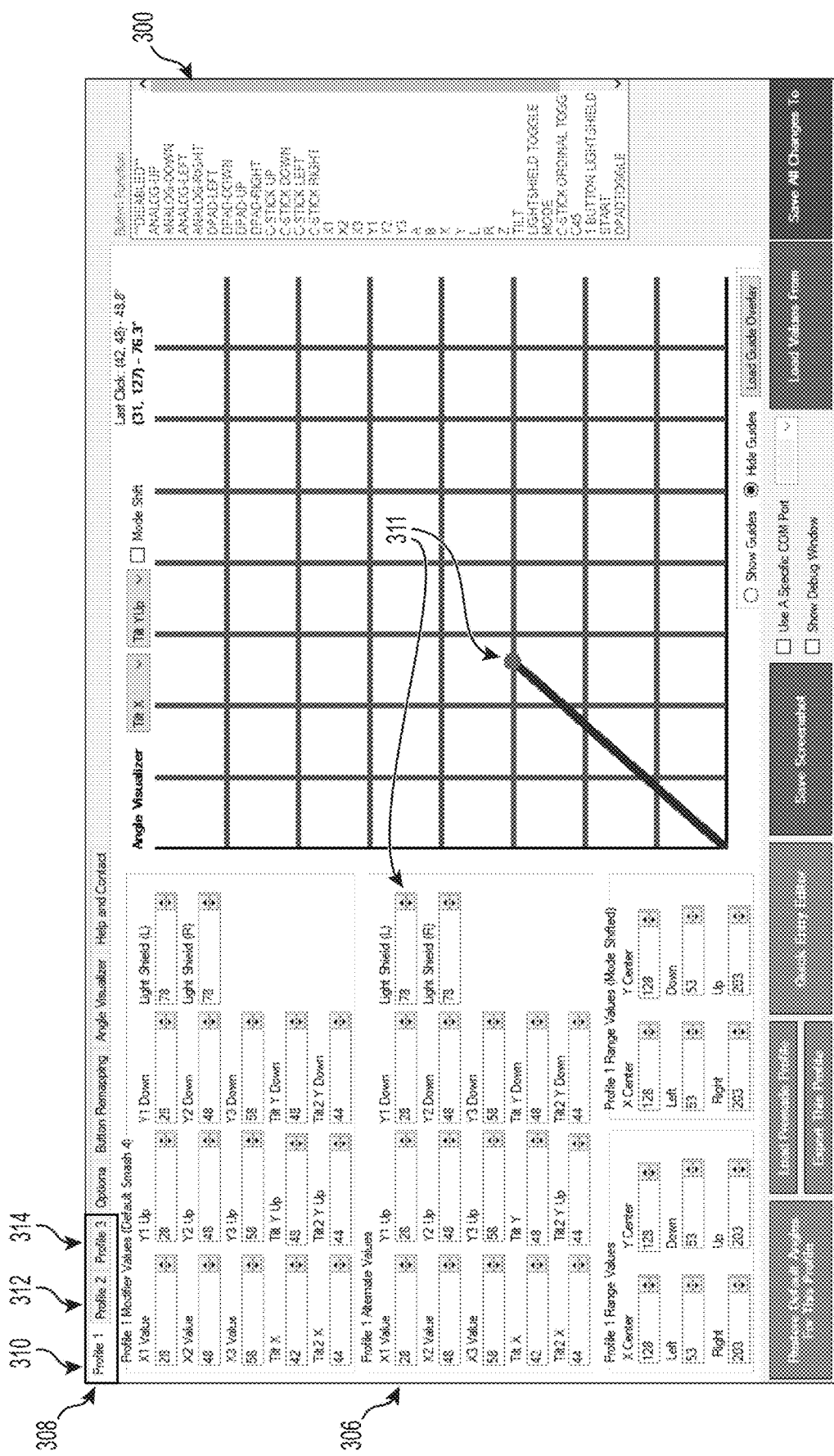
FIG. 5 is a user interface browser system having a first page of settings.

FIG. 4 illustrates a controller circuit 200 in accordance with one embodiment of the invention. The various elements provided therein allow for a specific implementation. Thus, one of ordinary skill in the art of electronics and circuits may substitute various components to achieve a similar functionality. The circuit 200 includes a power circuit system 202, a GCU system 204, a communications module 206, a server network 208, a computing system 210, and a button circuit system 211.

The power system 202 includes a power supply circuit 212 and a battery circuit 216 that are both monitored via a power supervision circuit 214. The battery circuit 216 includes a battery, which may be rechargeable, may be primarily charged via the power supply circuit 212, which may include a wired or wireless connection to a source of power. For example, the power supply circuit 212 may include a wired connection to a wall outlet, a computer, or a console, or a wireless induction charging system. A power testing unit 218 tests for current from the power supply circuit 202 to monitor power is being transmitted to the GCU system 204. For example, the power testing unit 218 can prevent dangerous surges of current and/or low levels of battery power from the battery circuit 216. A power warning LED 220 can be connected to the power testing unit 218, wherein the power testing unit 218 may be configured to flash the LED upon a low level of battery charge or provide a solid illumination if the power supply circuit 212 is connected to a charging source. Likewise, the LED may change in color or flashing upon the battery circuit 216 obtaining a complete charge.

Electricity from the power system 202 is transferred to the GCU system 204, which includes a controller 222 and the communications module 206. The controller 222 includes a processor 224 and a memory 226 having machine readable non-transitory storage. Programs and/or software 228 (such as arduino IDE) are saved on the memory 226 and so is input data 230 obtained via the many buttons in a button circuit system 211 and profile data 232 related to saved user preferences. An authenticate data 233 is also saved on memory 226 and will be described in greater detail below. The processor 224 translates and carries out instructions based on the software 228, input data 230, and profile data 232 and transmits the instructions to the computing system 210 via the communications module 206. The computing system 210 may include any type of computer, console, or like devices. The computing system 210 typically also includes or is connected to an audio output 234 and a screen 236. In use the computing system 210, for example a console, relays instructions from the communications module 206 and outputs them as actions that are visible via screen 236. These action can include in game actions, i.e., character or options selections associated with a video game and these actions may further include selecting various types of profile data 232 via a user interface 238 as will be discussed in greater detail below. The communications module 206 can include wireless (e.g., Bluetooth) and or a wired connection (PC Port USB shown in FIG. 3). In addition, the communications module 206 may be directly connected to the power supply circuit 212 such that during a wired connection with the communications module 206 to the computing system 210 charges the controller circuit 200 via power supply circuit 212.

The computing system 210 may further include an internet connection 240, which may be wired or wireless. The internet connection 240 provides access to the server network 208 for transmitting data between the memory 226 and the server network 208. The server network 208 may store various types of data. For example, profile data 232, software updates 242, authentication data 244, and social network data 246, and controller service data 248. In operation, as the GCU system 204 connects to the server network 208 via the computing system 210, allowing the transmission of data between memory 226 and server 208. Respective authentication data 233, 244 can be matched such that when a particular controller GCU system 204 is connected to the server network 208, options are provided based on historical use of that individual controller. For example, while the memory 226 may only be able to store a limited amount of profile data 232 (key layout, tilt sensitivity, modifiers, SOCD), other profile data 232 can be saved in the network 208 and accessed upon connection to internet. Authentication data 233, 244 can further be used to connect an individual controller to various social media platforms associated with the controller. For example, social media connectivity may allow sharing video game content like profile data, game screenshots, high scores, streaming videos, and recording videos. The transfer and changing of various data between the memory, server, etc., can be selected via numerous visual ques in the user interface 238. Importantly, various profile data can also be changed and saved via the user interface 238 without connection to the internet via software or data saved locally in either the memory 226 or computing system 210 that is displayed on the user interface 238.

The button circuit system 211 connects to the variously described buttons to the rest of the controller circuit 200. For example, these various buttons may include an override button circuitry 248, a first assemblage of buttons circuitry 230, a menu button circuitry 286, a second assemblage of buttons circuitry 132, a third assemblage of buttons circuitry 234, a fourth assemblage of buttons circuitry 136, a second modifier button 156 circuitry, and a sensor circuitry 233. Inputs of the various buttons can be translated by the GCU system 204 in accordance with data saved on the memory 226, for example, key networking. The GCU system 204 may further include a conversion module 235 that converts the velocity/distance in which a various button is pressed to a range of corresponding voltages that are used to represent specific values of the afore described "tilt." For example, the conversion module 235 may include a potentiometer electrically connected to each button such that the axial distance or speed of button travel correlates directly or inversely to the degree of associated "tilt." Alternatively, profile data can be saved to change between buttons such that all or select buttons are translated as digital on/off inputs, i.e., no tilt or full tilt only. While not explicitly shown in FIG. 4, joystick circuitry may also be included on the button circuit system 211. Likewise, the button layouts presented in FIGS. 11A through 12I and variations thereof may also be included in the button circuit system 211.

As illustrated in FIG. 5 through FIG. 9, the user interface 238 includes a browser system 300 visualized on the screen 236. With initial reference to FIG. 5, the browser system includes a plurality of profile data setting pages 306. The plurality of profile data setting pages 306 includes a series of sub-page tabs 308 corresponding profile settings including a first profile page 310, a second profile page 312, and a third profile page 314. Each profile page can include value modifiers of various buttons, joysticks, and sensors, i.e., modifying the correlation between the distance of button travel, joystick tilt, sensor movement with the degree of tilt input. These modifier settings can be set at various values to set the tilt magnitude of the cardinal directions, the neutral center position, and analog magnitude of left and right triggers. These setting may also include options for changing the center of the joystick or comparative buttons, the position of the button (or range of positions) before in game actions are registered. A corresponding visual indicator 311 is further provided as a meta view of the individual button settings. For example, in the event that a left movement button and a right movement button are pressed simultaneously, the modifier values will determine corresponding in game actions. If the left movement button has a larger modifier than the right movement button, then the pressing of both buttons simultaneously, will result in a left input less that of the right modifier value. The concept extends to any combinations: up and down combinations, upper left corner (up and left movement) and down right corner (down and right movement) combinations, etc. The modifier values can also be switched from analog to digital inputs. Each profile 310, 312, 314 may also include an associated button layout. As described above, the various profiles can be changed on-the-go via the first setting switch 190 and a second setting switch 192 (FIG. 3).

Figure 6A:
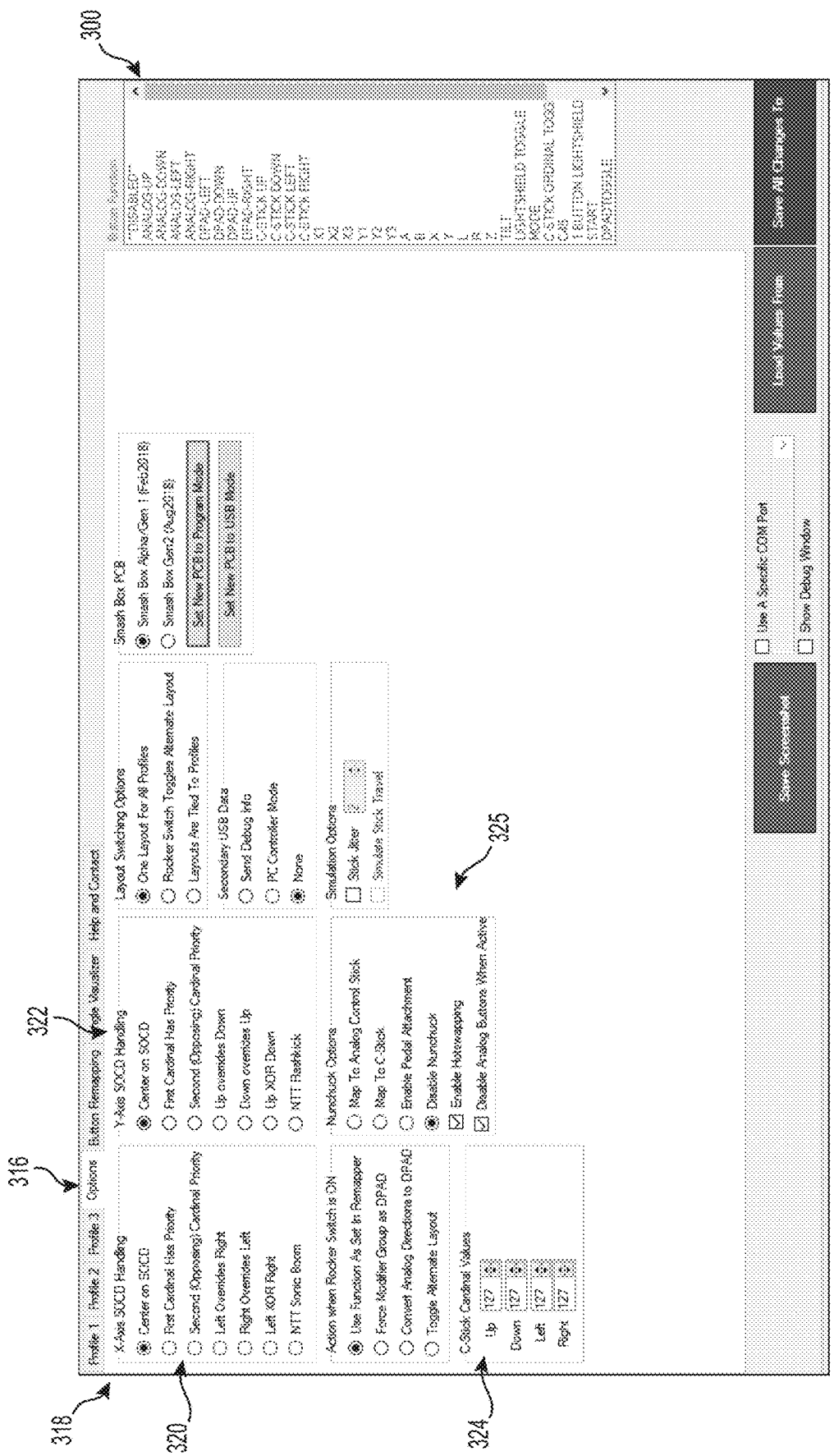
FIG. 6A is the user interface browser system having a second page of settings.
Figure 6B:
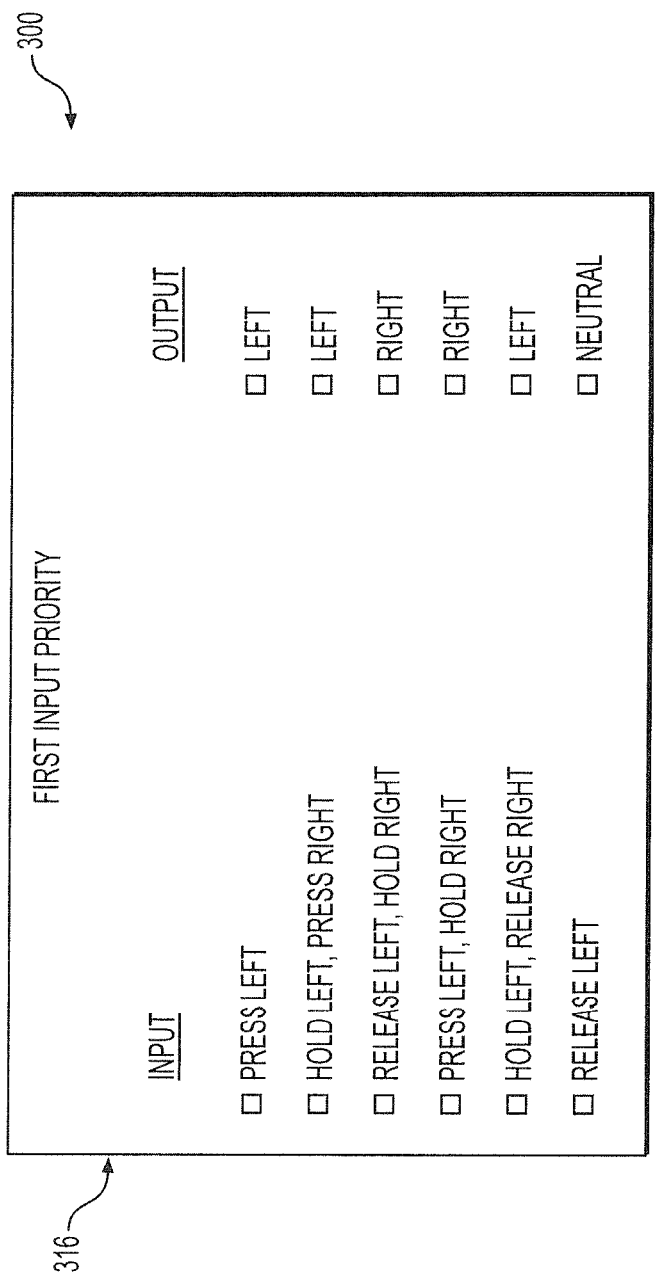
FIGS. 6B through 6F illustrate multiple selectable profile features from the second page of settings.
Figure 6C:
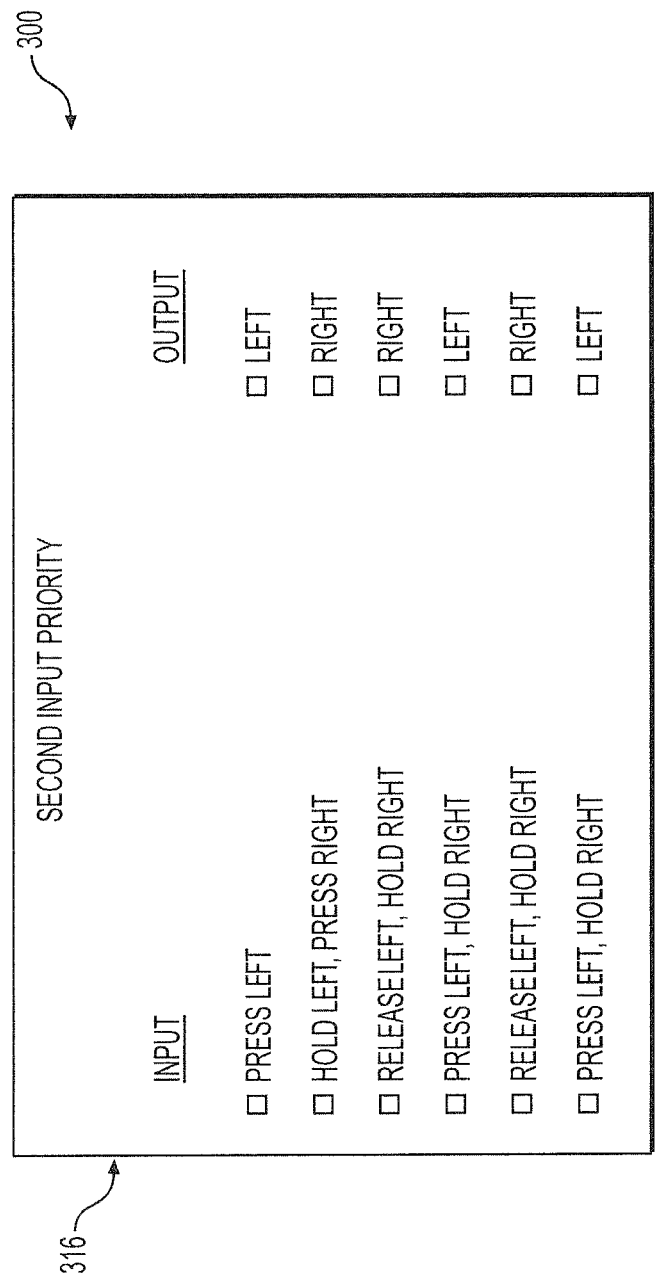
Figure 6D:
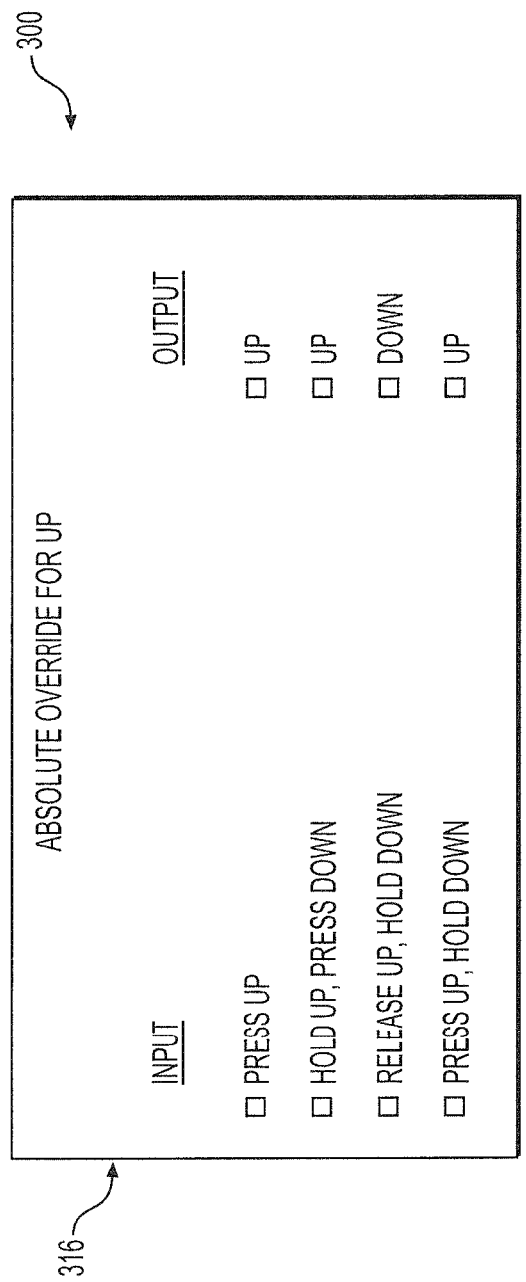
Figure 6E:
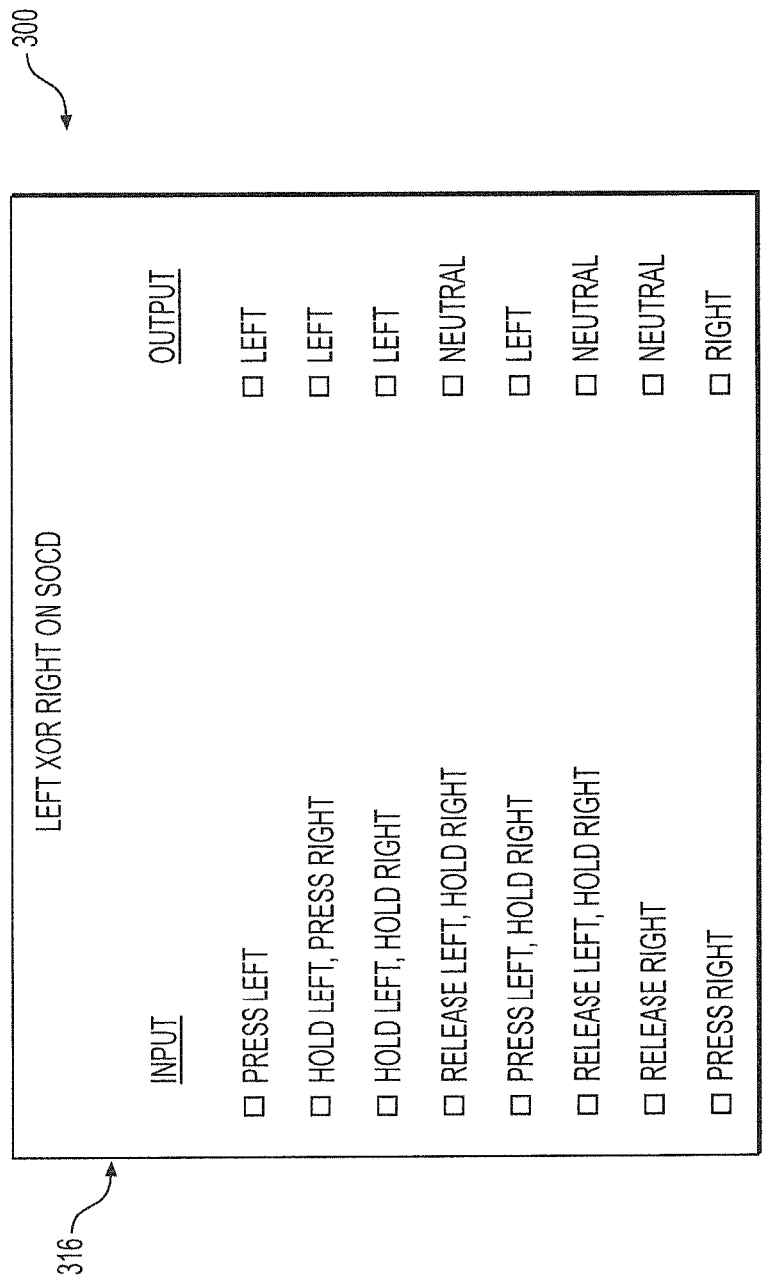
Figure 6F:
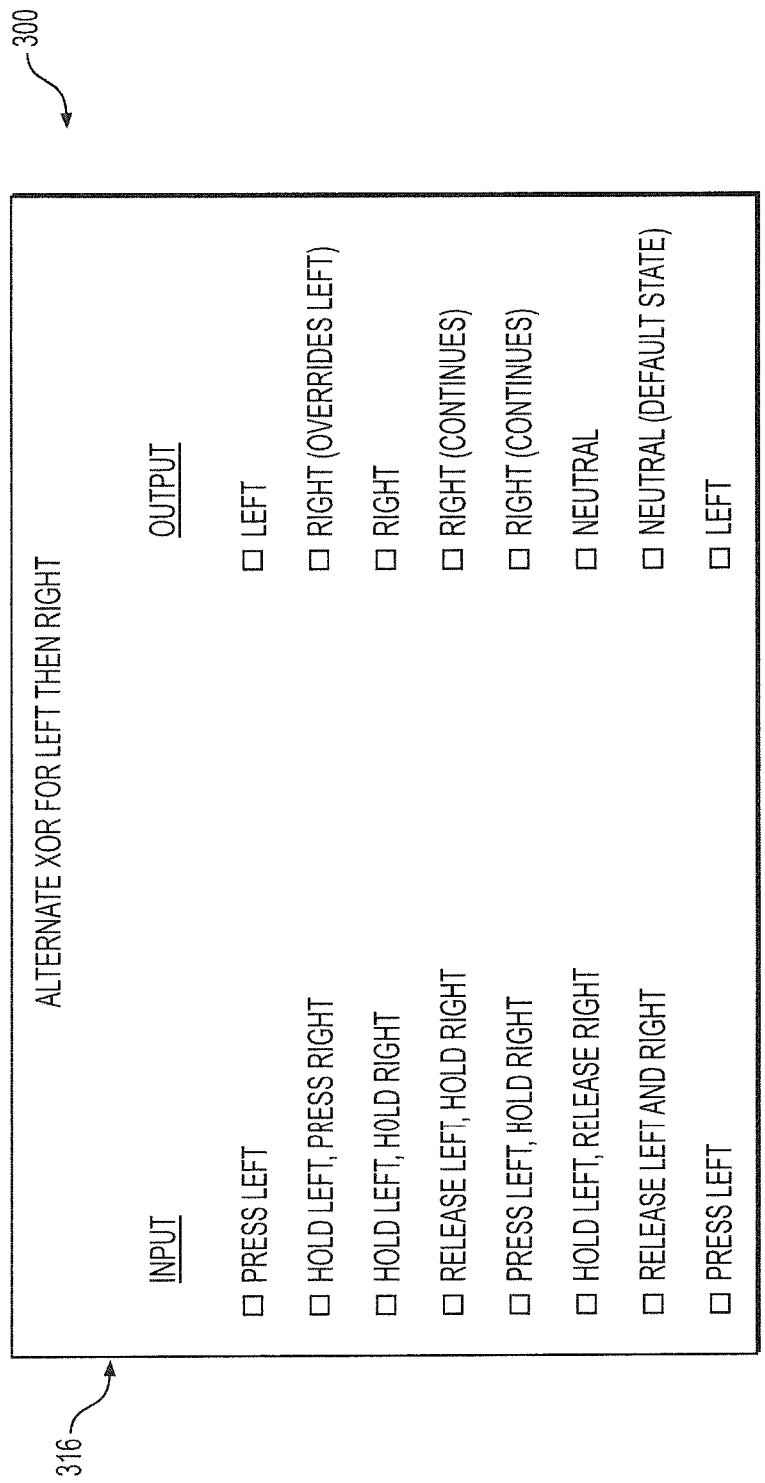

Referring now to FIG. 6A, browser system 300 further includes a second setting 316 for profile data that provides override options in instances wherein buttons are pressed in simultaneous opposing cardinal directions ("SOCD"). These override options are presented for both X-axis and Y-axis conflicting button presses. Stated another way, in instances where the left movement button 138 and the right movement button 140 are being pressed simultaneously, both inputs are conventionally neutralized such that the character or object appearing on the screen does not move. While a joystick cannot be simultaneously tiled in the left and right direction, the override system resolves this impossibility for a button assemblage joystick equivalent. The second setting 316 includes a series of override options 318, which determine the direction of the game input, such as character movement. The override options 318 includes an X-axis override option 320, a Y-axis override option 322, a setting switch override option 324, and a joystick enablement option 325. The X-axis and Y-axis override options 320, 322 include several selections. For example, a neutral selection is included where simultaneous pressing of opposing movement buttons negate or cancel each other out. In addition, there are selections that relate to the time at which the buttons are pressed, for example the first button to be pressed overrides the second, or vise-versa, example overrides are shown in FIG. 6B through 6F. FIG. 6B includes a "first input priority" section wherein the first button pressed will always override the second opposing button pressed. FIG. 6C includes a "second input priority" wherein the second button pressed will always override the first opposing button pressed. Another selection is "absolute override" (example shown in FIG. 6D) based on direction, for example, left always overrides right and up always overrides down. In yet another option, shown in FIG. 6E as "Left XOR Right on SOCD," the left movement input is based on XOR wherein holding of the left input nullifies the right input and the right input is based on an SOCD protocol. FIG. 6F shows yet another example wherein a left movement input is overridden by a right movement input which nullifies the left movement input. The XOR settings in FIGS. 6E and 6F are similar to the absolute override scheme, however, when the overridden button is no longer pressed, the oppositely pressed button does not move the in game object until the oppositely pressed button is released and then pressed again. As will be described in detail below, the SOCD scheme can further be applied to analog readings wherein opposing cardinal values are subtracted and movement is in the direction of the largest cardinal value less the opposing cardinal value via the following formula ((opposing voltage A+opposing voltage B)/2).

Figure 7:
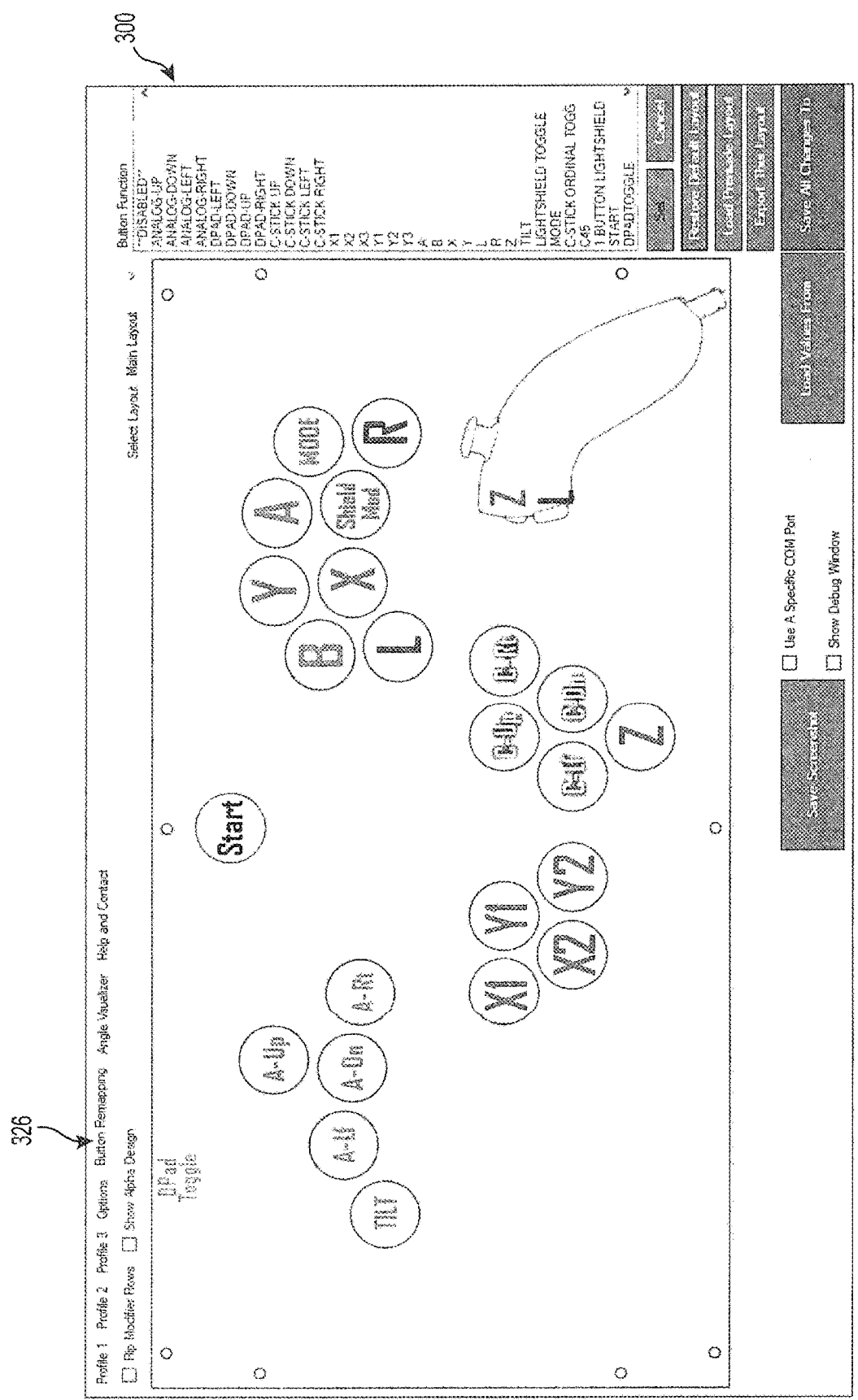
FIG. 7 is the user interface browser system having a third page of settings relating to button mapping.

Referring now to FIG. 7, browser system 300 further includes a third setting 326 that provides button mapping options. Each user-profile includes a button mapping option for individual mapping associated with different players and/or for different games. In addition, to button mapping it includes a Fractional Input Bind data, i.e., an input bind that requires multiple inputs to trigger. The Fractional Input Bind data can implement input bind via a specific configuration of wire connections between buttons, i.e., a meta reader unit that recognizes specific buttons being simultaneously pressed and translates output command from a distinct module to the processor. Alternatively, the Fractional Input Bind data can be translated by the processor via profile data that recognizes specific simultaneous button inputs and translates that to an in-game output. For example, A+B=A+B+C, where "Pushbutton A" and "Pushbutton B" together simultaneously trigger fractional input bind C. As such, when a user presses Attack (A) and Special (B) simultaneously, it yields the input of Attack, Special, and Jump (Y) without actually pressing the Y button. In another example, A+B=C, where "Pushbutton A" and "Pushbutton B" together simultaneously trigger fractional input bind C and nullify and/or repurpose their normal functions. In one implementation, Left+Right buttons=Neutral. The Fractional Input Bind algorithm can also bind modifiers, for example, X1 modifier+X2 modifier grants a third unique modifier X3 for a third degree of "tilt." Similarly Y1 modifier+Y2 modifier=Y3 modifier.

These fractional input binding settings can further include Multi-Input Binds, Negative Input Binds, Cycle Input Bind Modifiers, Nullify features, Lockouts, combinations therefore and additional binding options. In the Multi-Input Binds, profile settings further include the ability to assign multiple functions to one button. For example, buttons input bind is set to output "A" and "B" by only pressing "Y" (D-pad left+D-pad right input can be achieved by pressing one button). In the Negative input bind, an input bind that triggers its function when an input is disengaged, i.e., the button is no longer being pressed. In the Cycle Input Bind Modifiers, an input bind is selected to change functions with each input and/or output (AKA, allowing an auto-combo via pressing the same button repeatedly). In the Nullify binding, a function that temporarily disables of one or more other functions, such as a "kill switch" that disables other buttons when pressed. In the Lockout binding, preceding inputs can trigger the nullification of one or more inputs following a specific state for a certain amount of time. For example, if the "A" button is pressed, it prevents the "B" button from functioning for one second. In another example the "A" button is pressed and the "B" inputs upon release of "B"). A pushbutton input may further have a multi-input bind function bound as: engage, output "A"; disengage, output "B." The various examples set forth herein are exemplary in nature and can be implemented with any of the modifier, function, and movement bottoms. While certain features may be available in some game menus as software features, the subject disclosure provides the ability to map specific binds to inputs on a controller interface hardware side as a default or customizable user experience.

Figure 8:
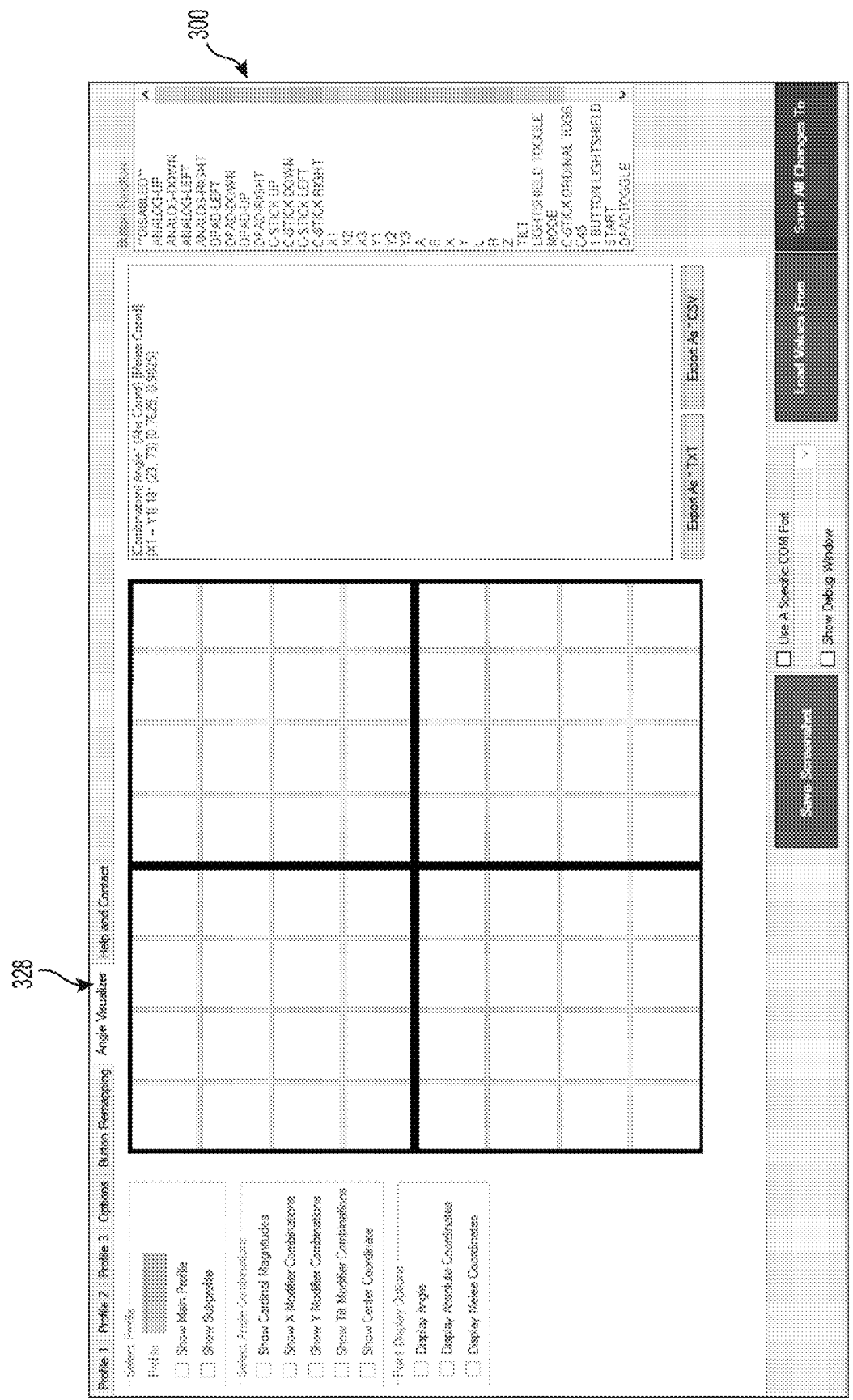
FIG. 8 is the user interface browser system having a fourth page of settings.

FIG. 8 illustrates a fourth setting 328 of the browser system 300 that provides a graphical representation of all or certain of the above referenced settings in one user profile including graphical representations of the various cardinal settings, input binds, etc.

Figure 9:
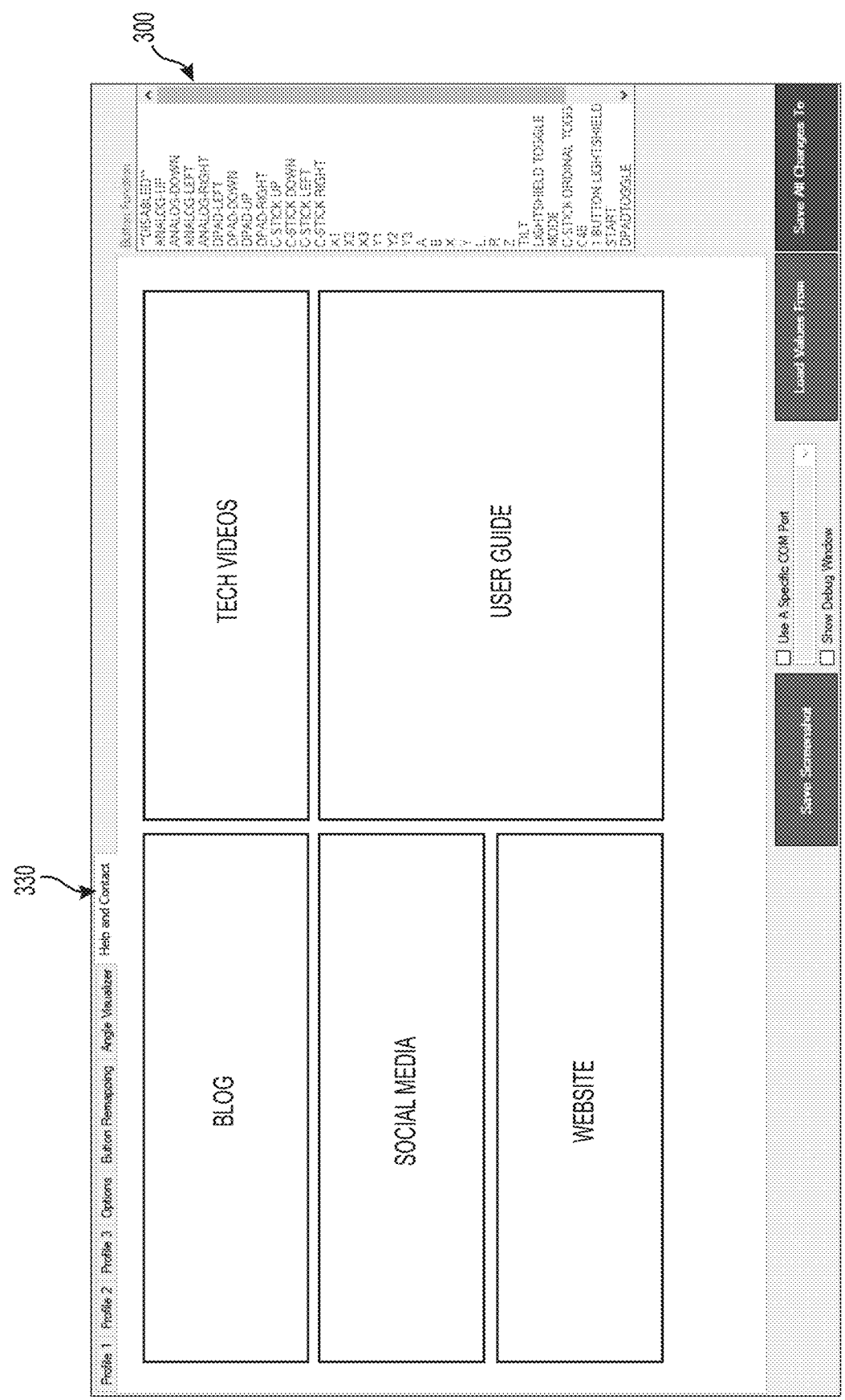
FIG. 9 is the user interface browser system having a fifth page of settings with various internet connectivity features.

FIG. 9 illustrates a fifth setting 330 of the browser system 300 that provides controller information and social media platforms associated with social network data 246. As described above, using authentication data 233, 244 once a controller is connected to the browser system 300 and network 208, an individual controller may be connected from the browser system 300 of the user interface 238 to various social media platforms associated with that controller or owner of the controller. More than one controller may be associated with one player and/or social media platform wherein more than one authentication data 233 may be associated with a single user.

These values and settings presented in FIGS. 5 through 9 can be programmed in browser system 300 and saved in memory 226 or server 208. Moreover, the features described in FIGS. 5 through 8 can be saved as profile data 232 that can be switched on-the-go with toggle switches 190, 192.

Figure 10:
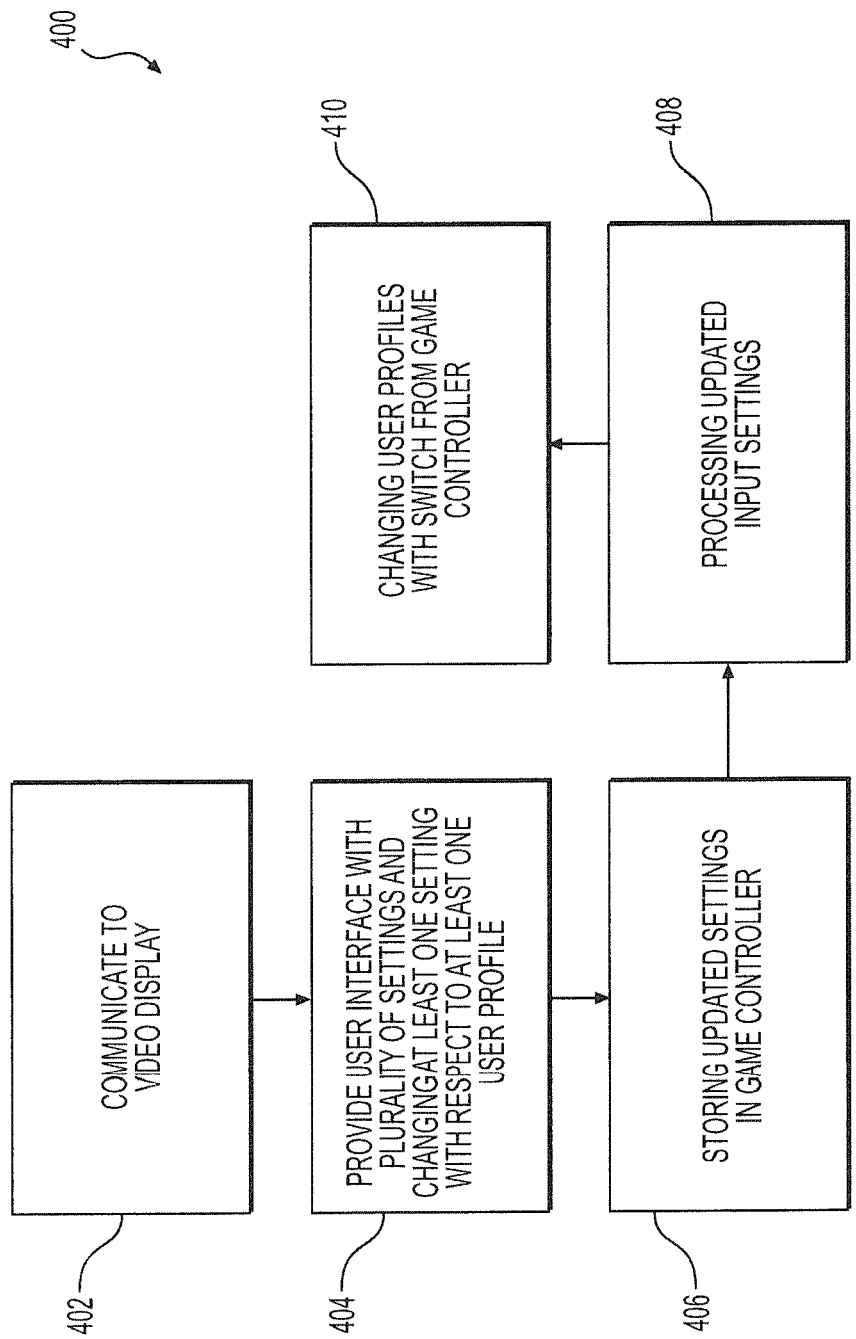
FIG. 10 illustrates a method of changing settings on the gaming controller and saving them locally within the controller.

FIG. 10 provides a method 400 of setting up user profile data specific to a user. The method 400 begins by communicating 402 to a video display or computing system, providing 404 a user interface with a plurality of settings as described above and changing at least one of the settings. The method 400 continues with storing 406 updated settings in the game controller, processing 408 the updated input settings, and changing 410 user profiles with a switch physically located on the game controller.

Figure 11A:
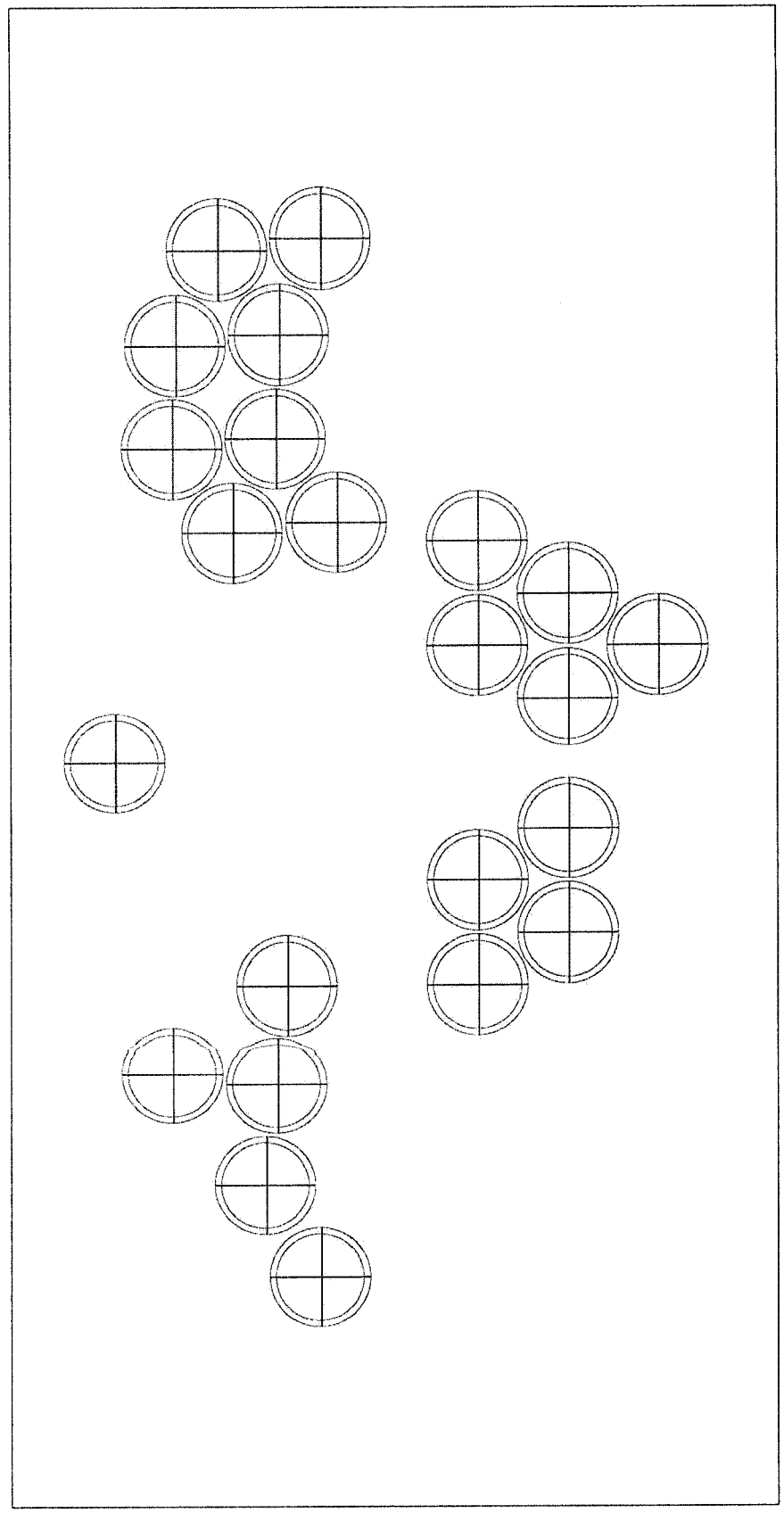
FIGS. 11A through 11W illustrate various button and joystick layout in accordance with another aspect of the disclosure.
Figure 11B:
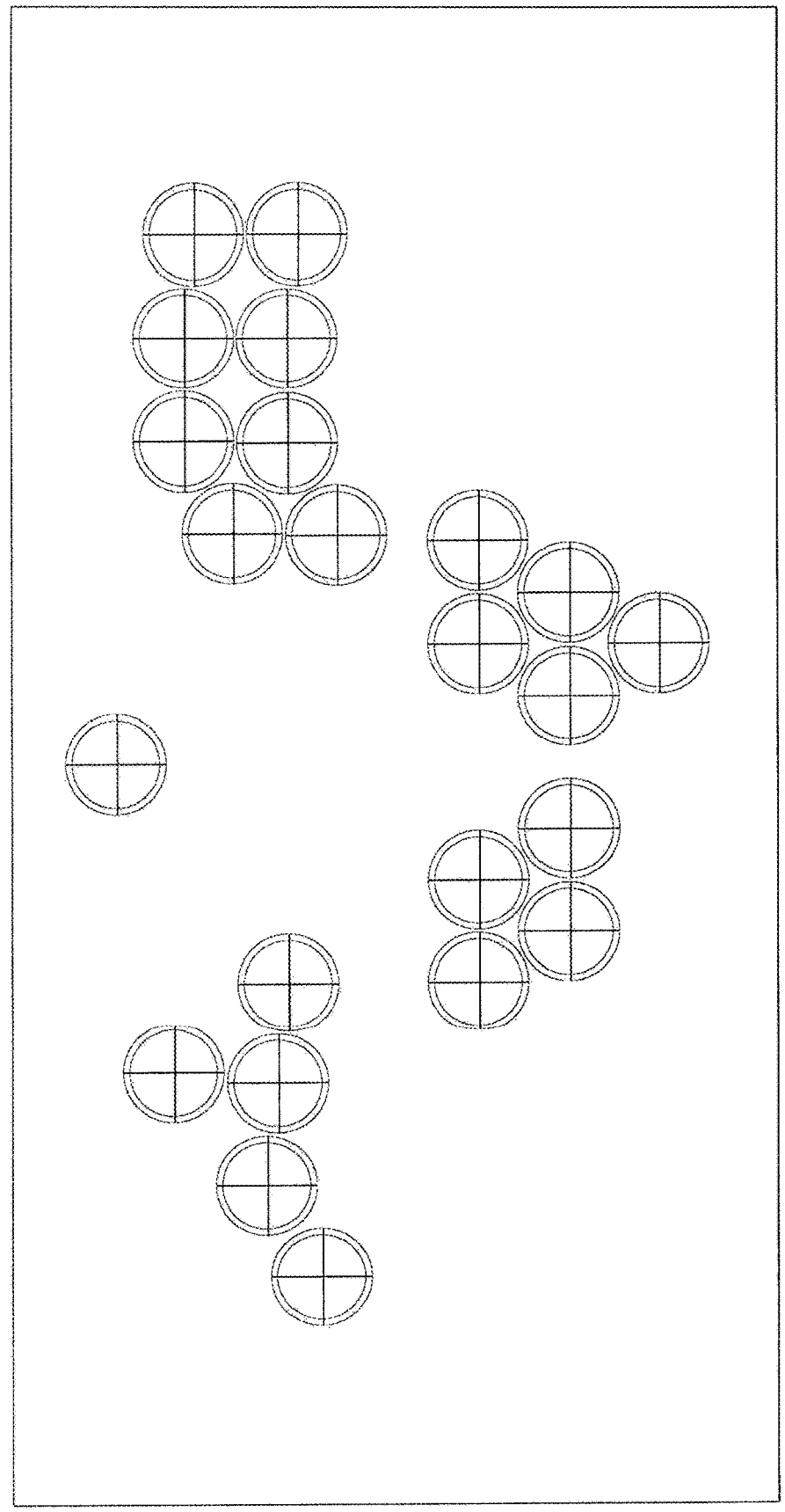
Figure 11C:
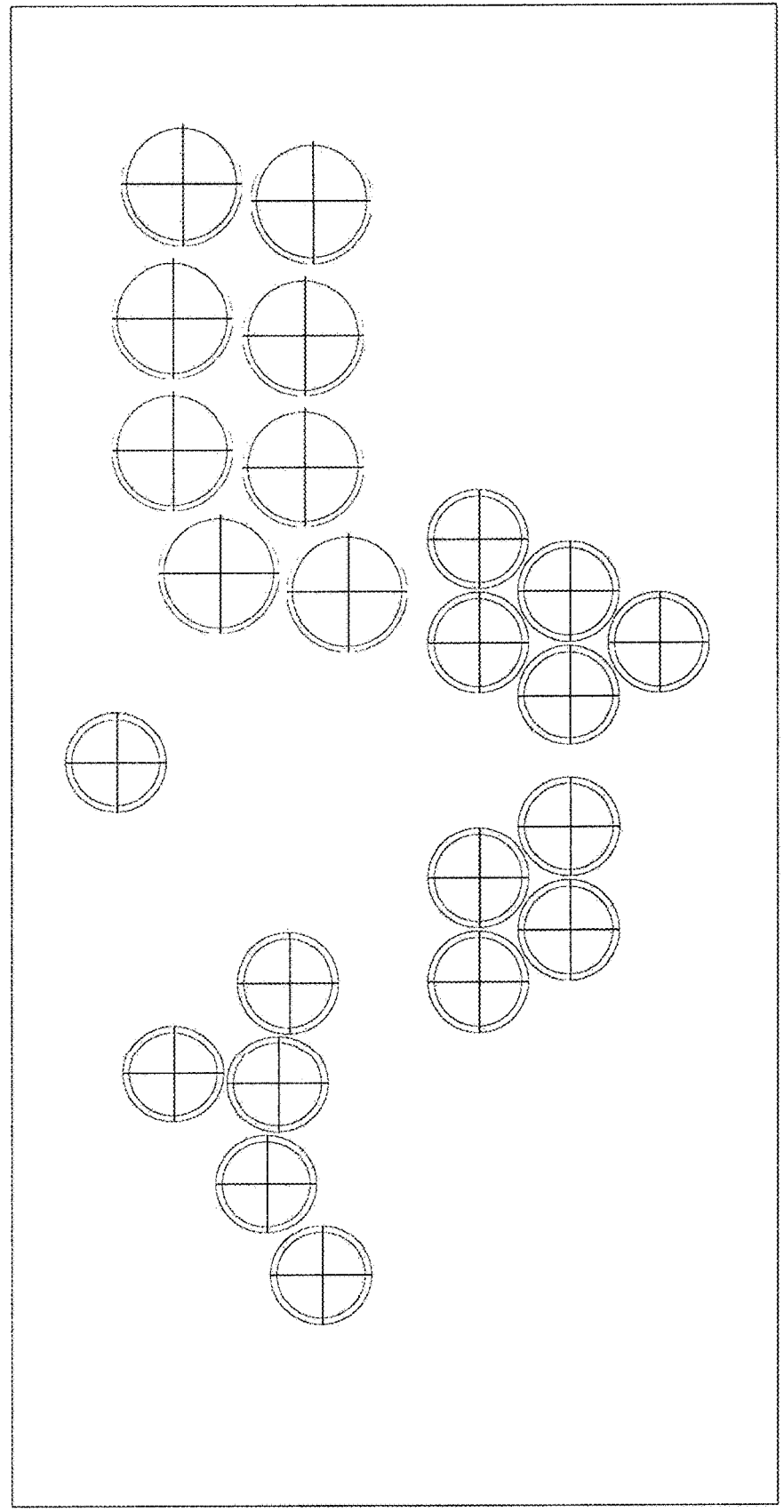
Figure 11D:
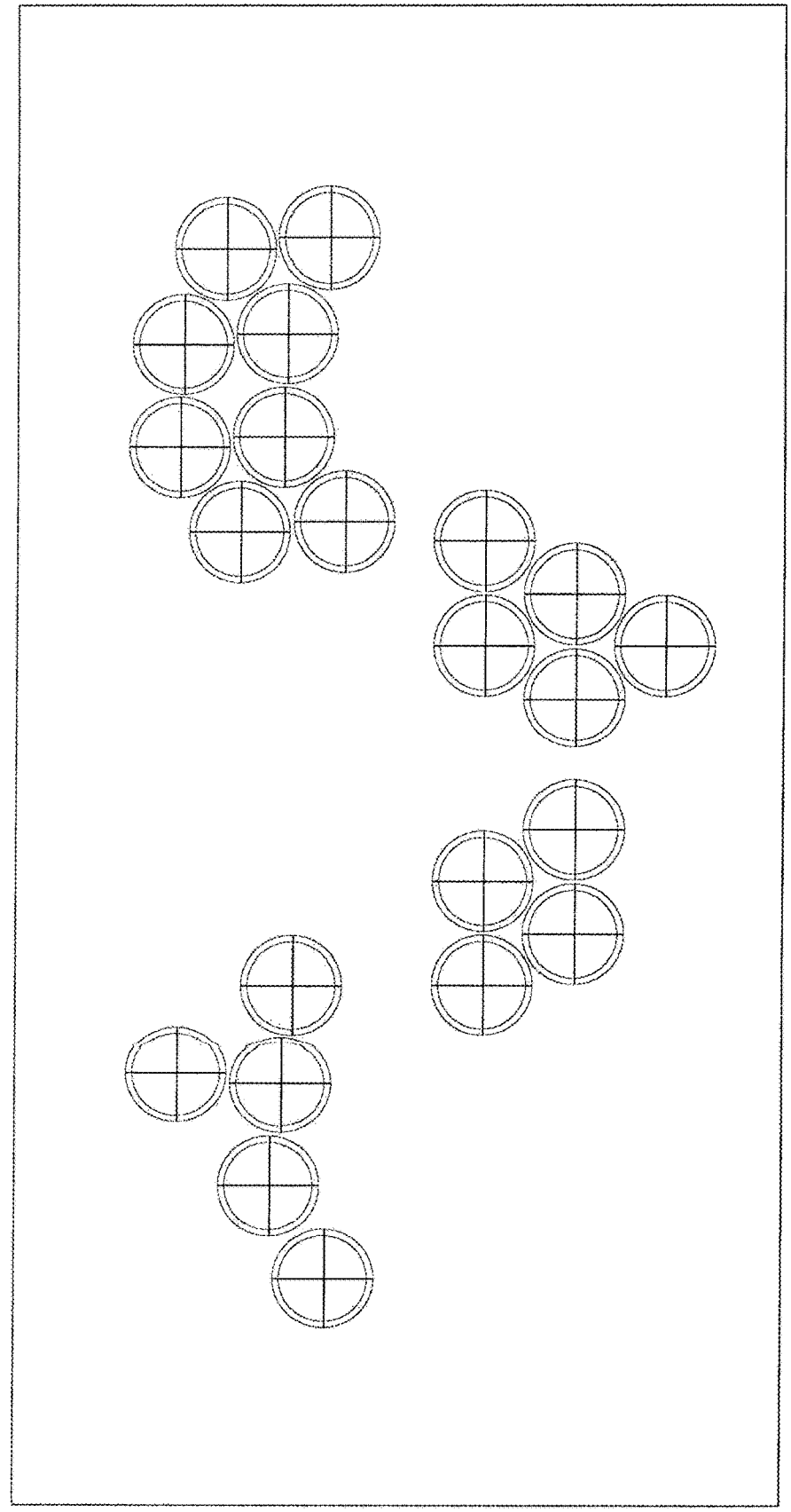
Figure 11E:
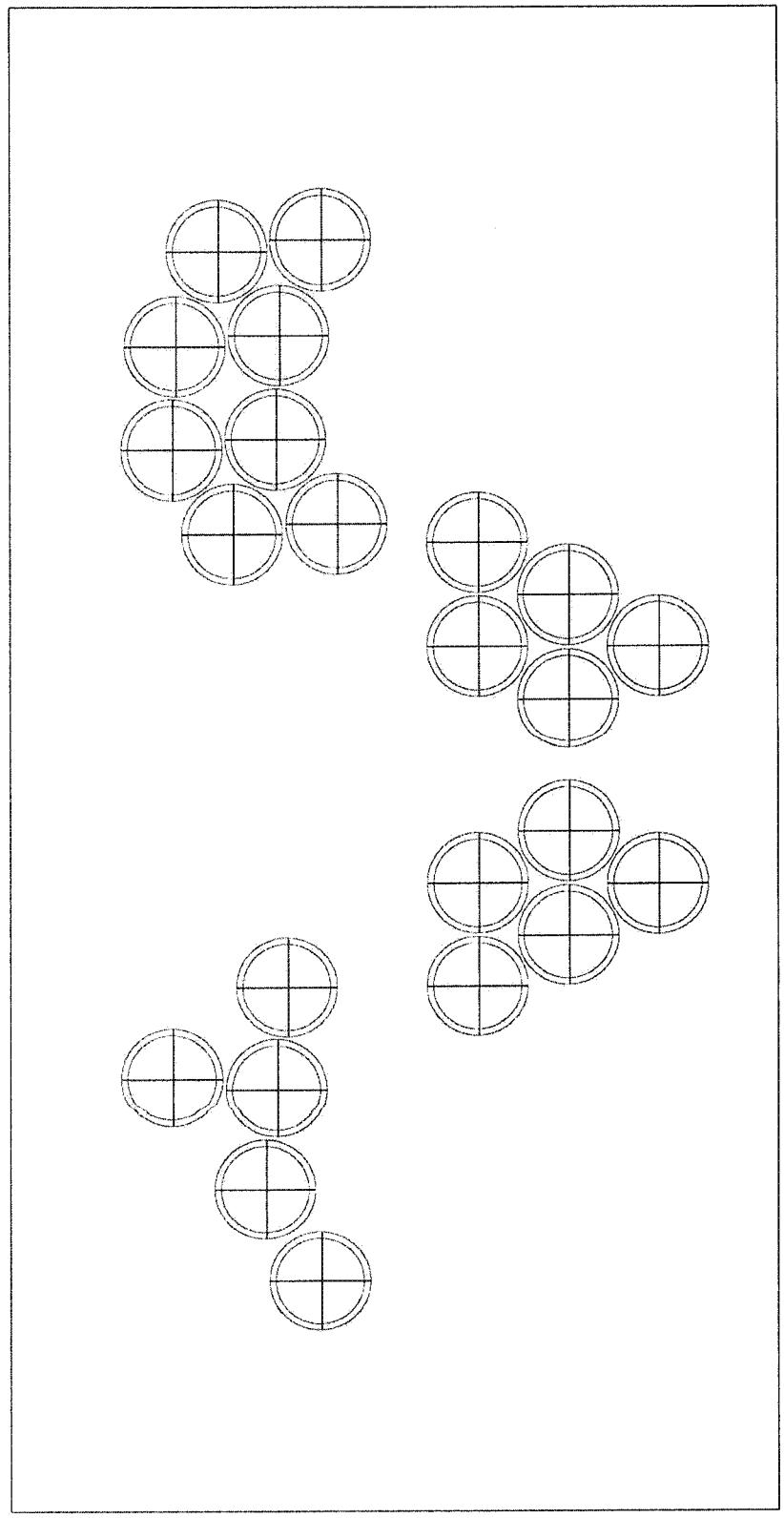
Figure 11F:
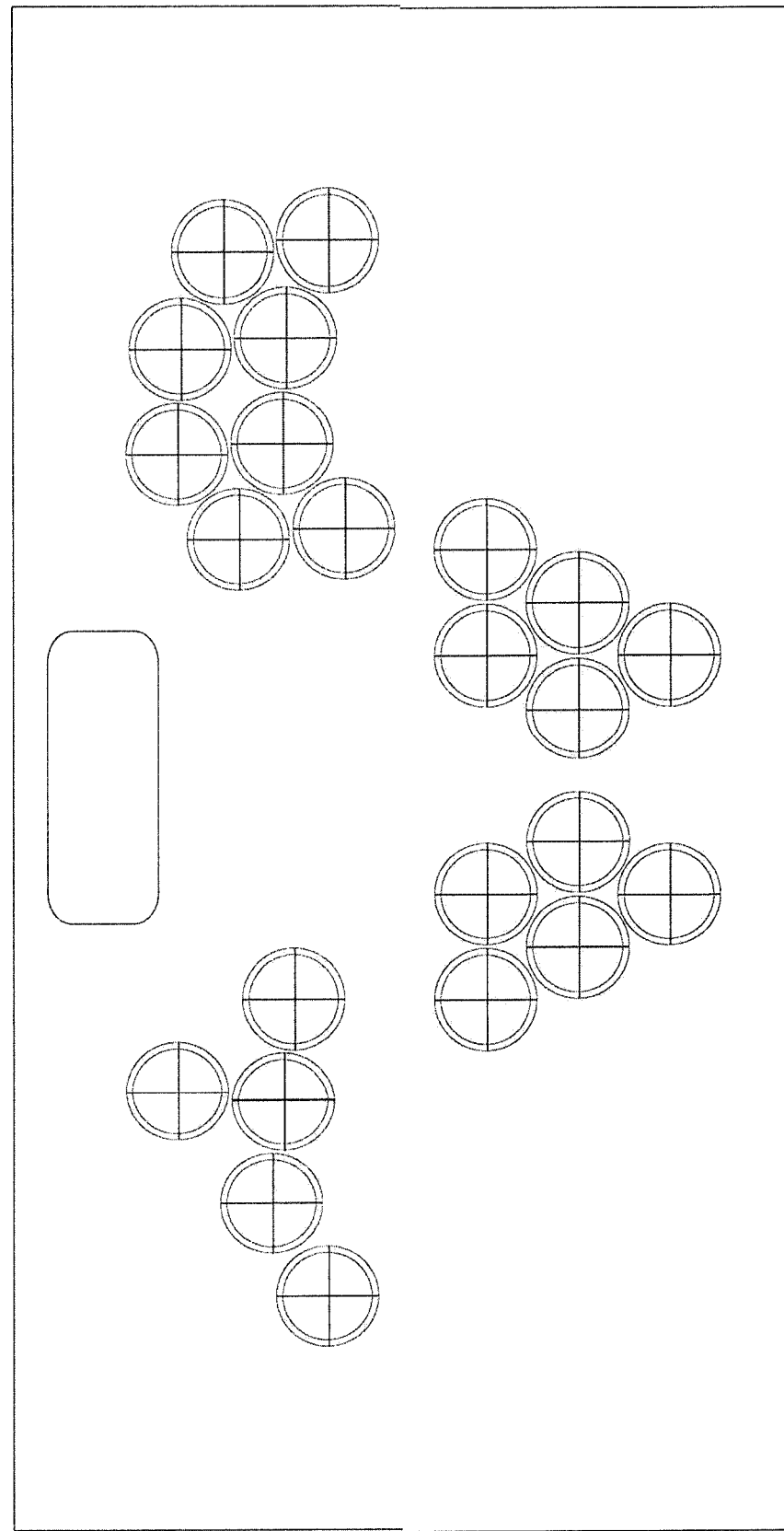
Figure 11H:
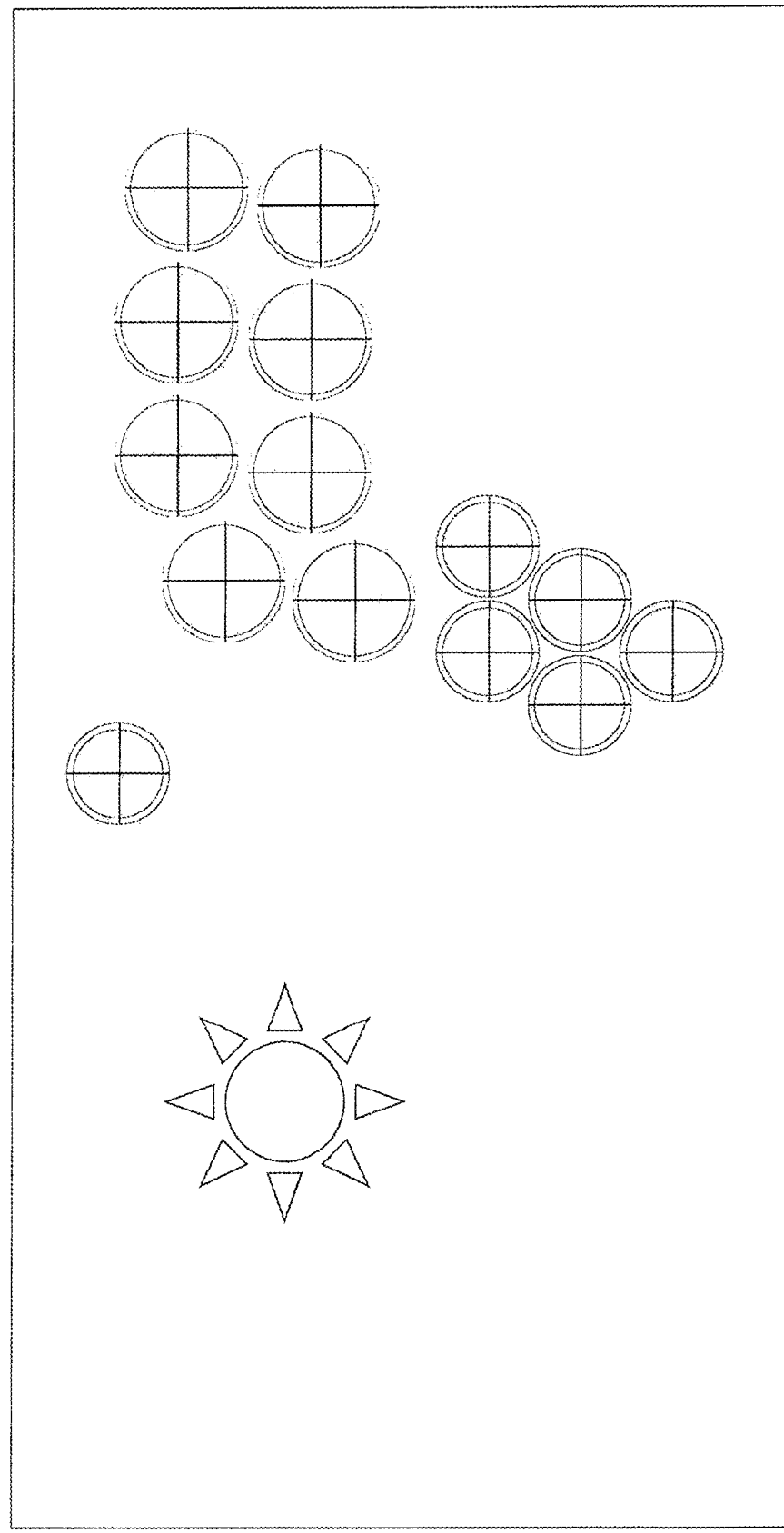
Figure 11I:
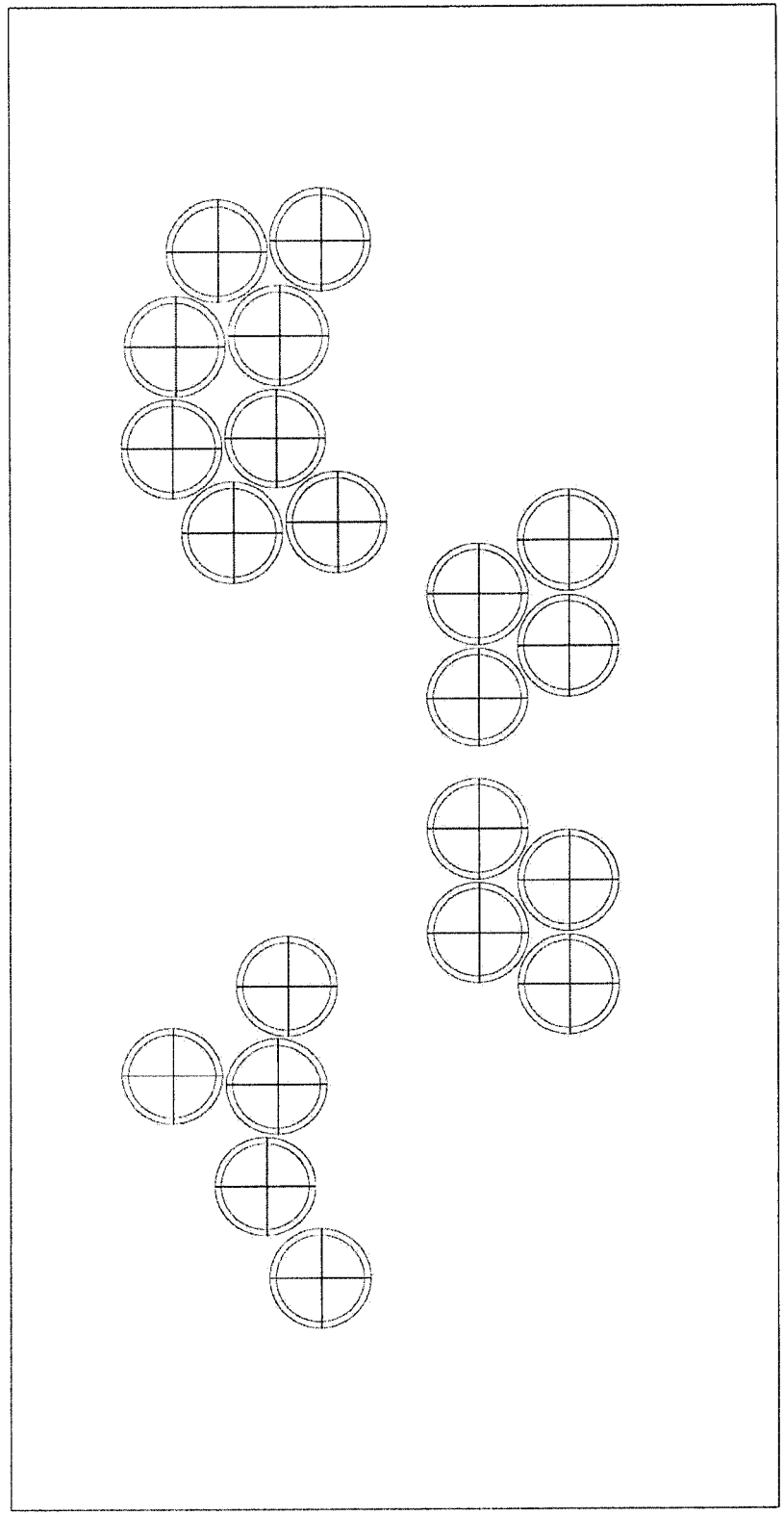
Figure 11J:
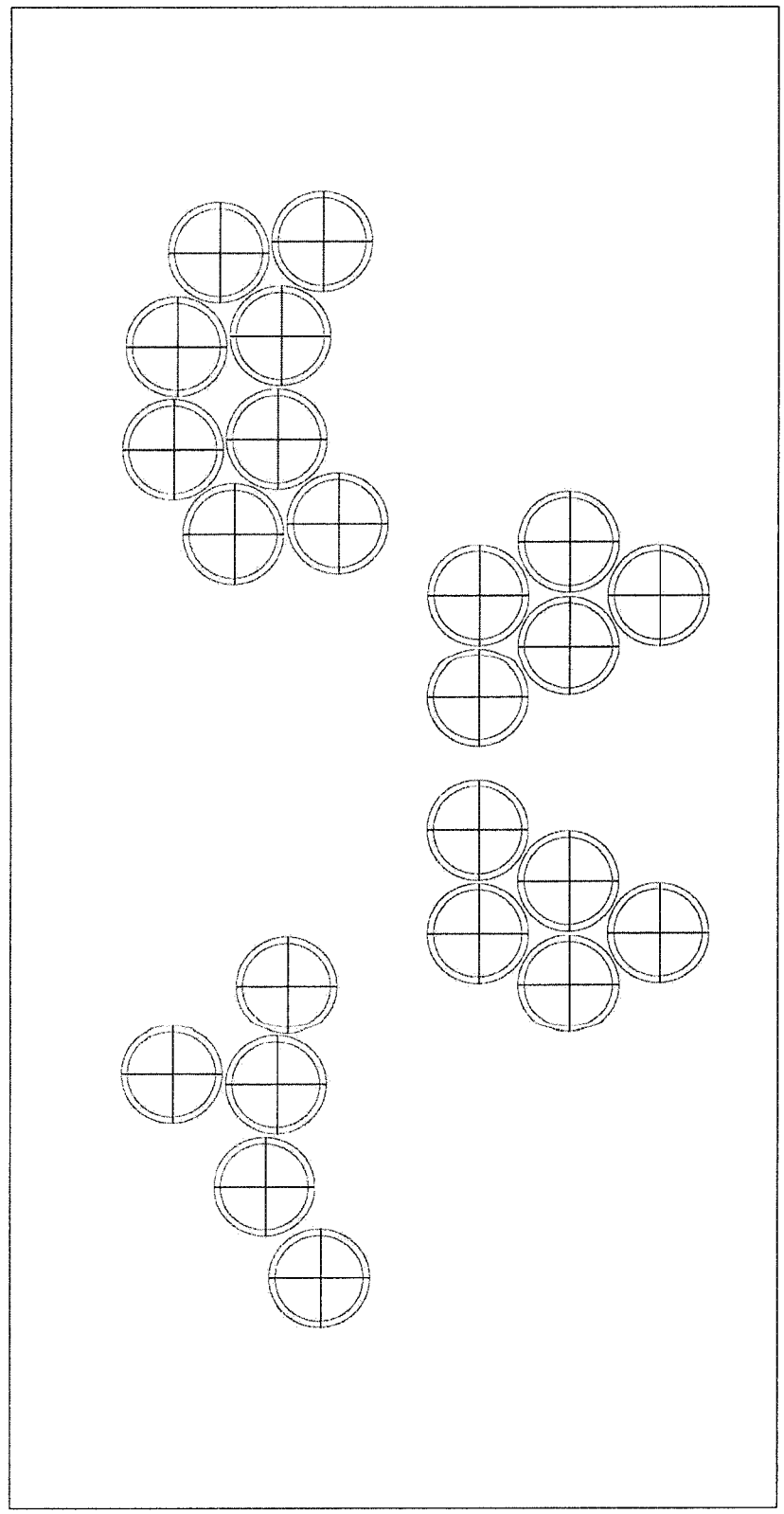
Figure 11L:
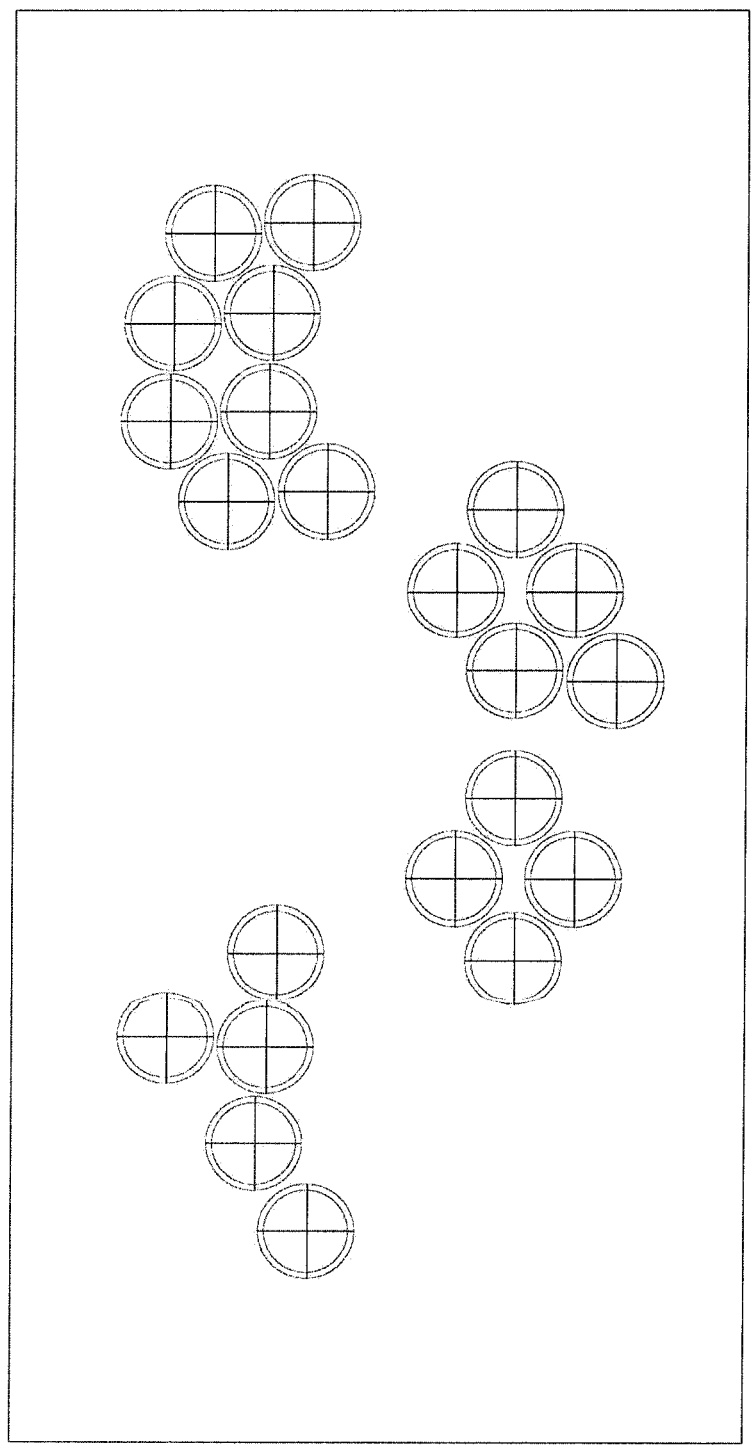
Figure 11N:
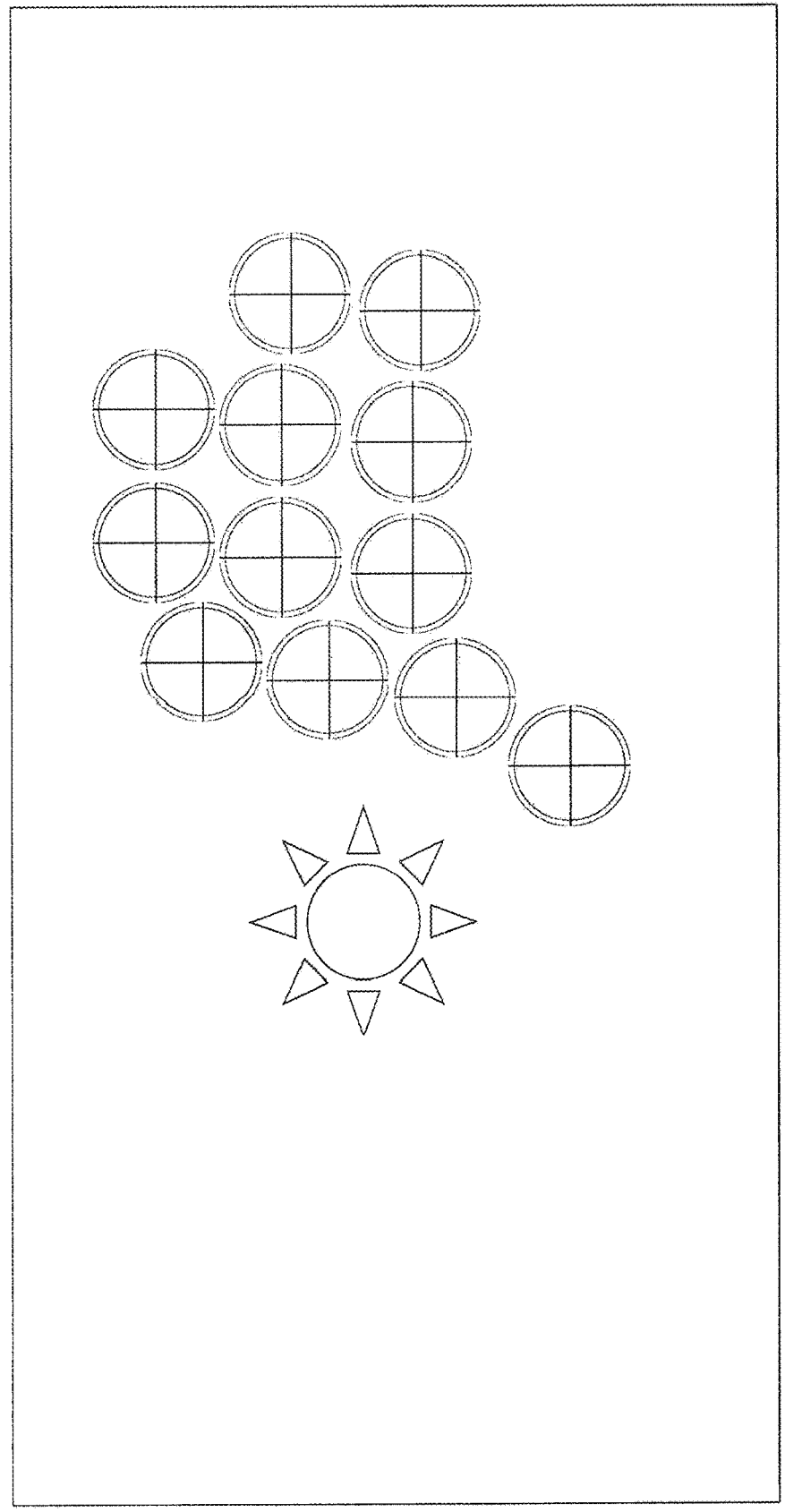
Figure 11O:
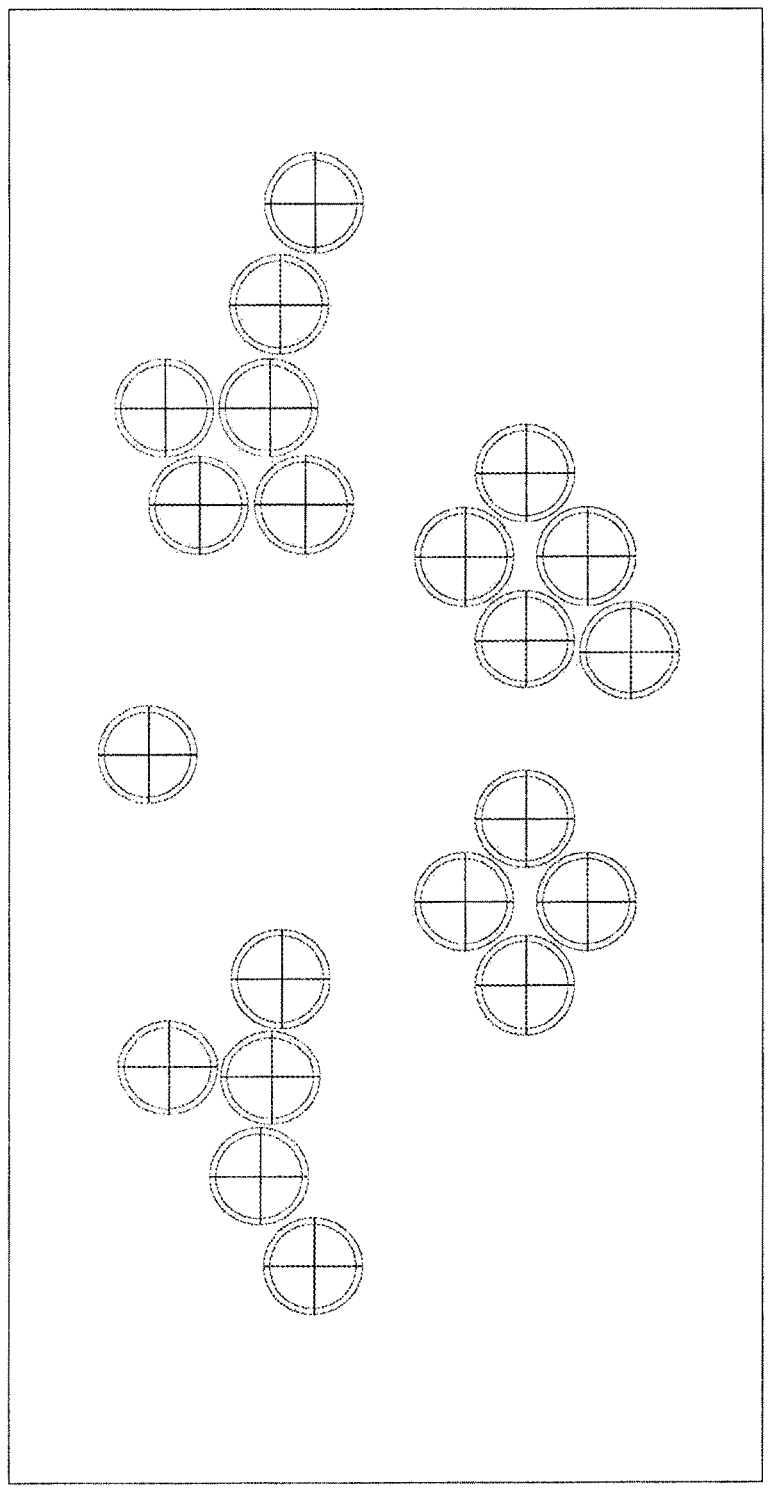
Figure 11P:
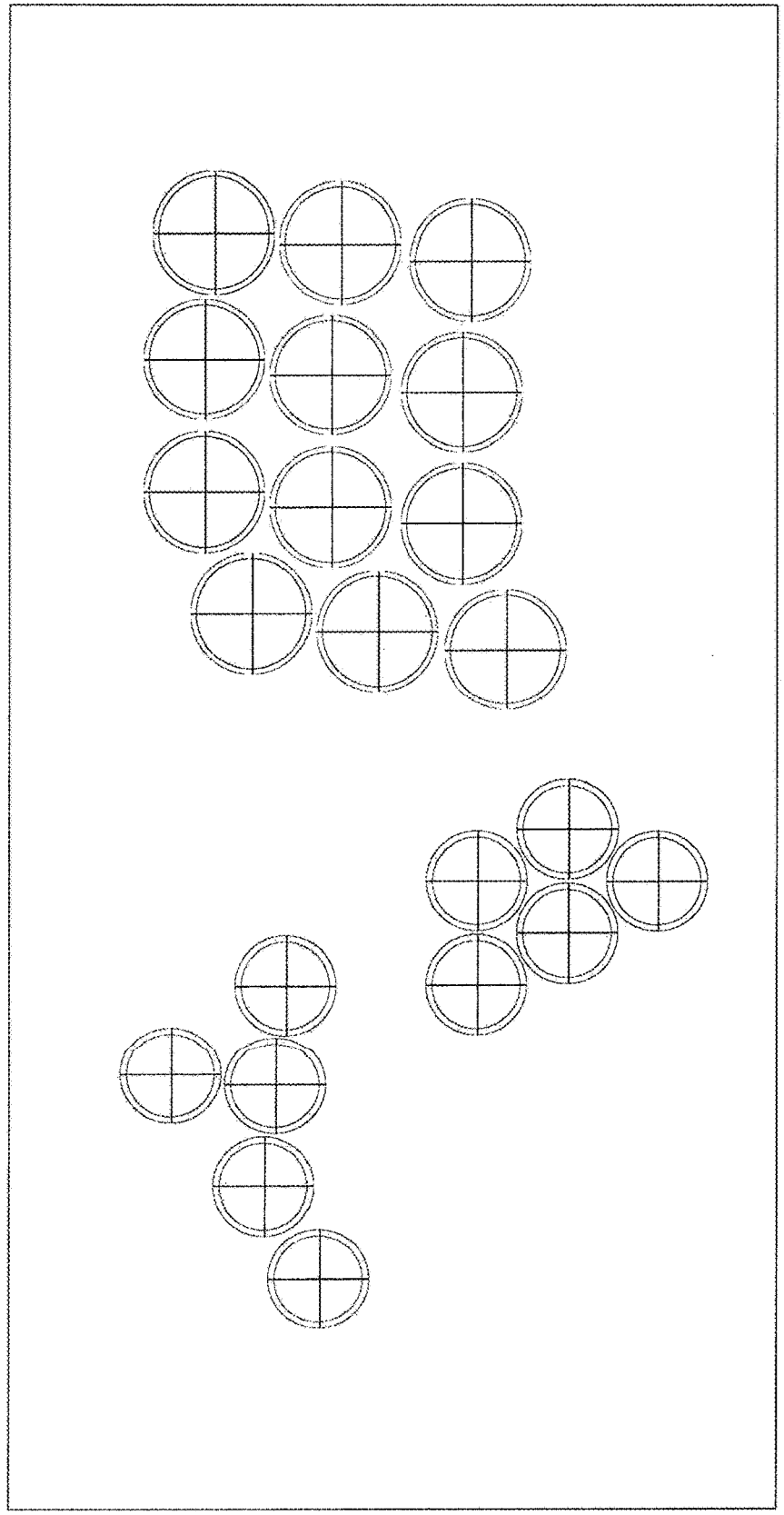
Figure 11Q:
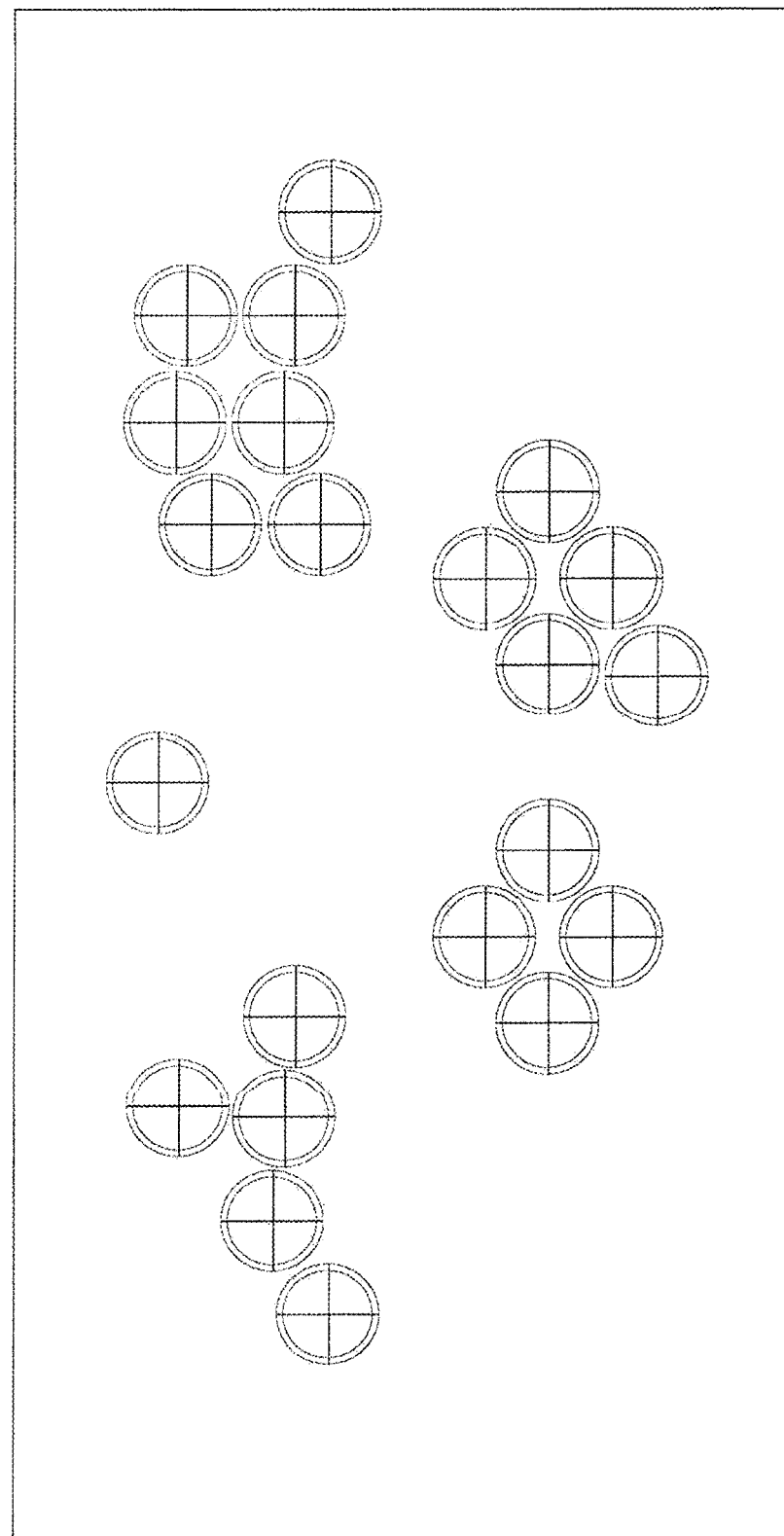
Figure 11R:
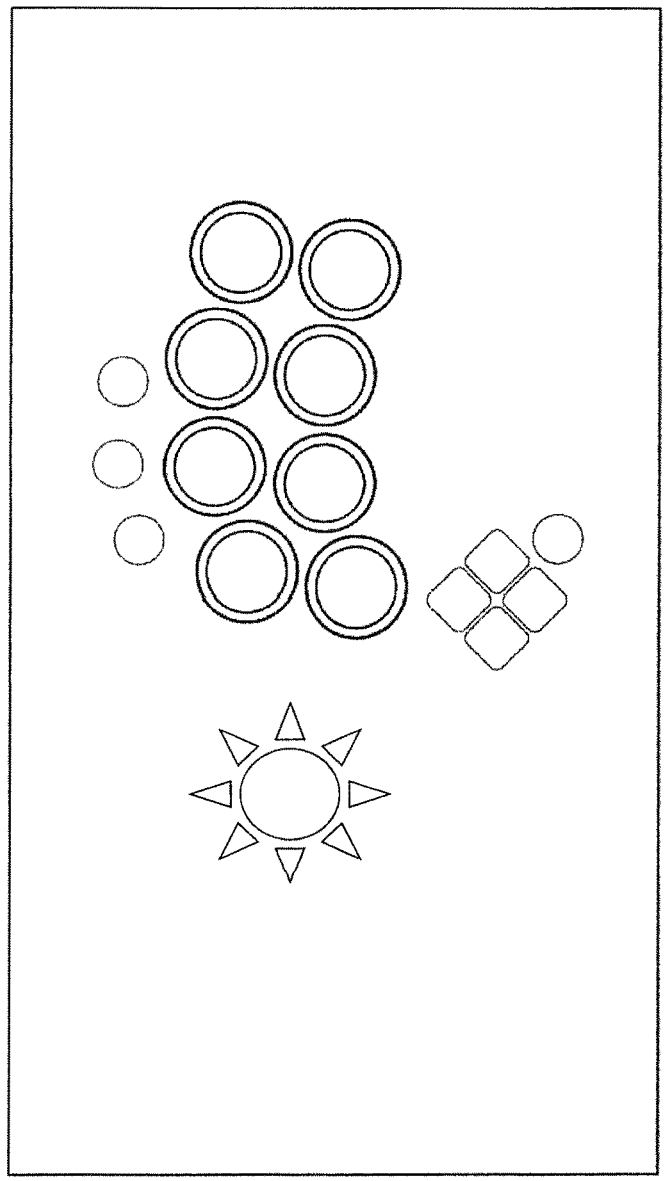
Figure 11S:
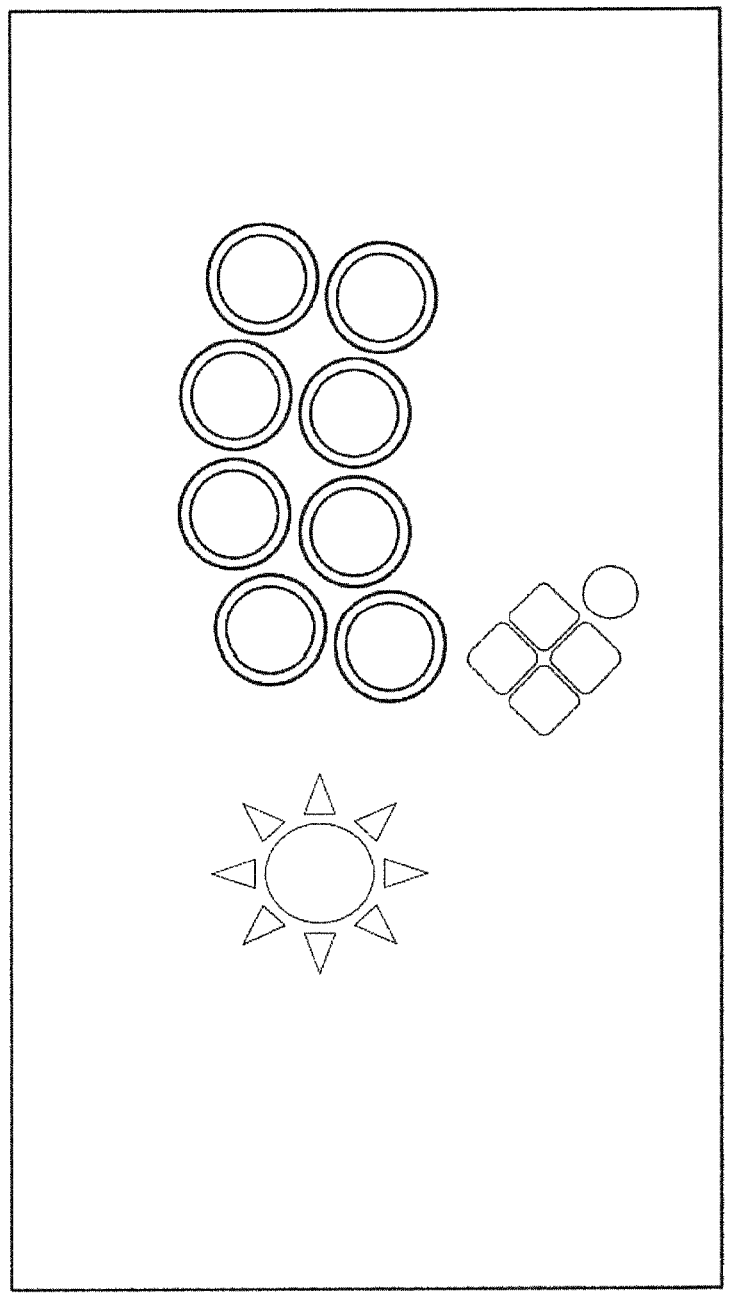
Figure 11T:
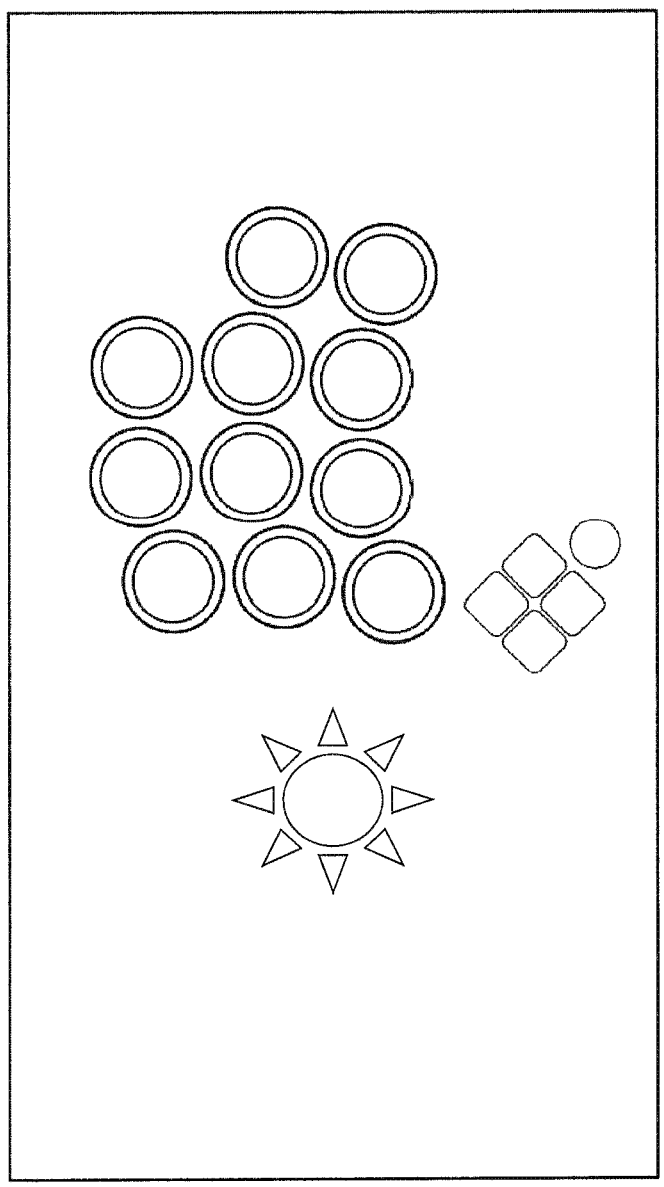
Figure 11U:
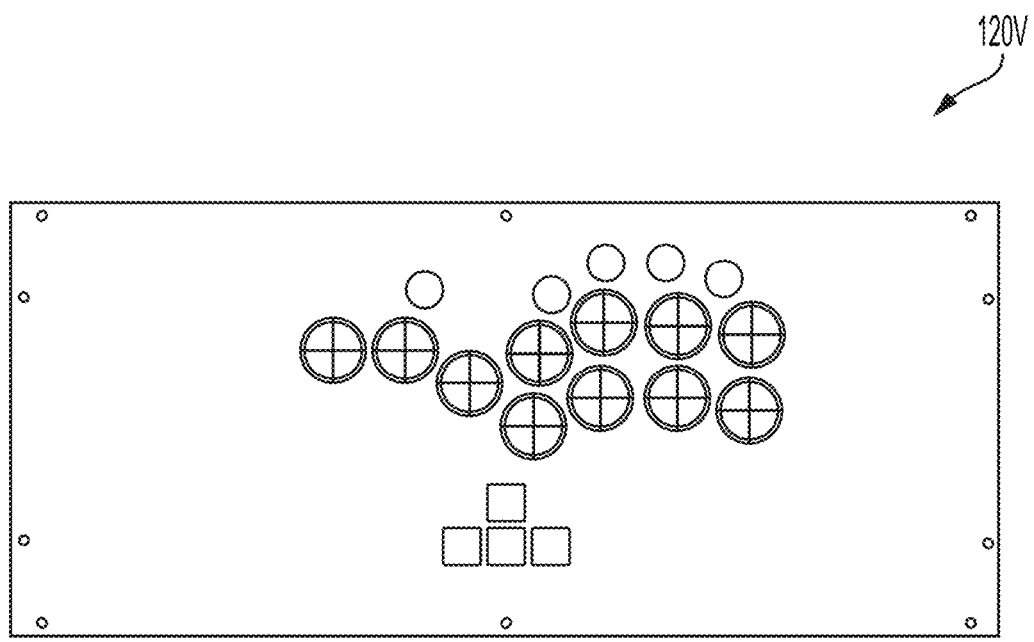
Figure 11V:
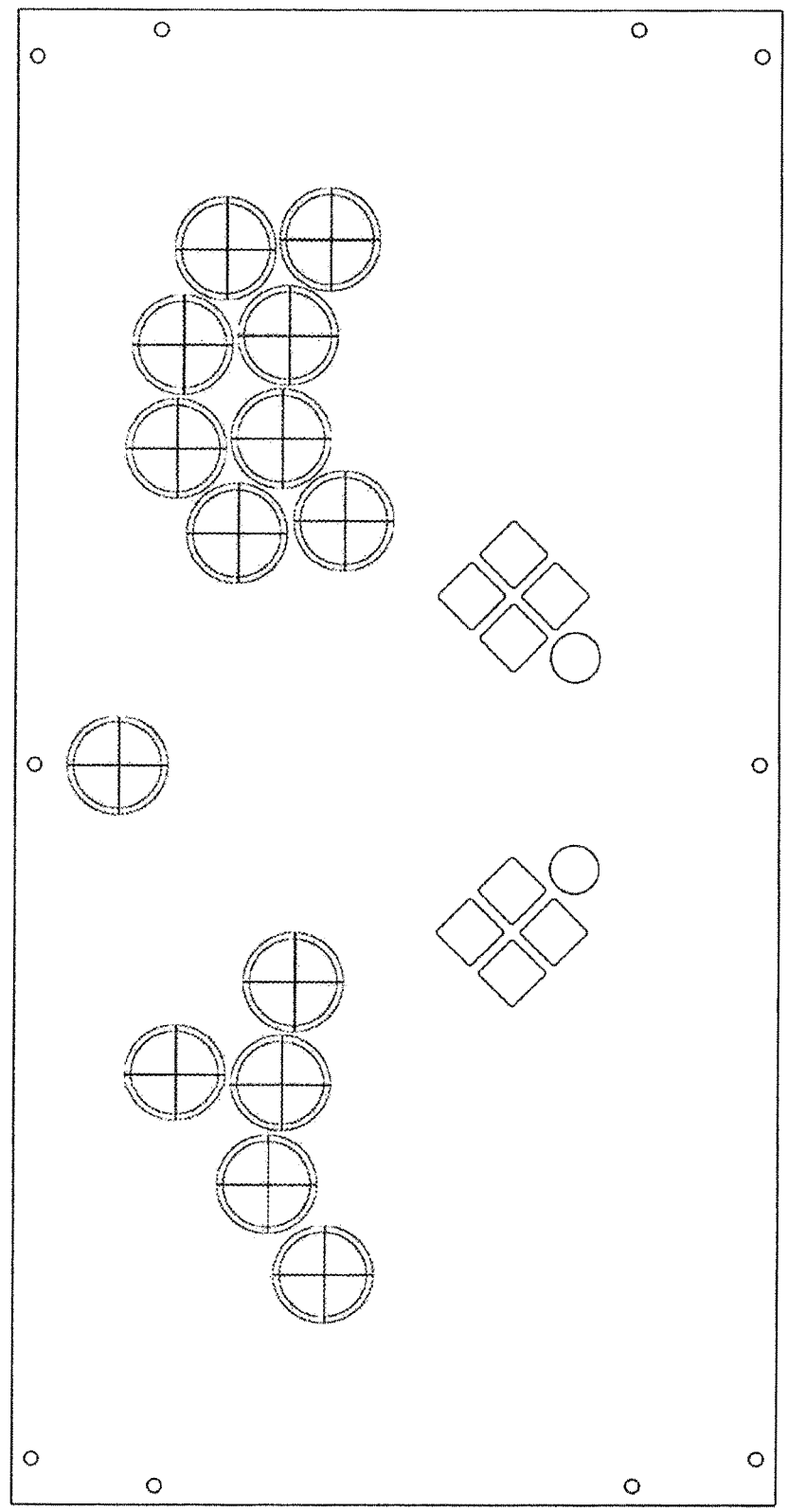
Figure 11W:
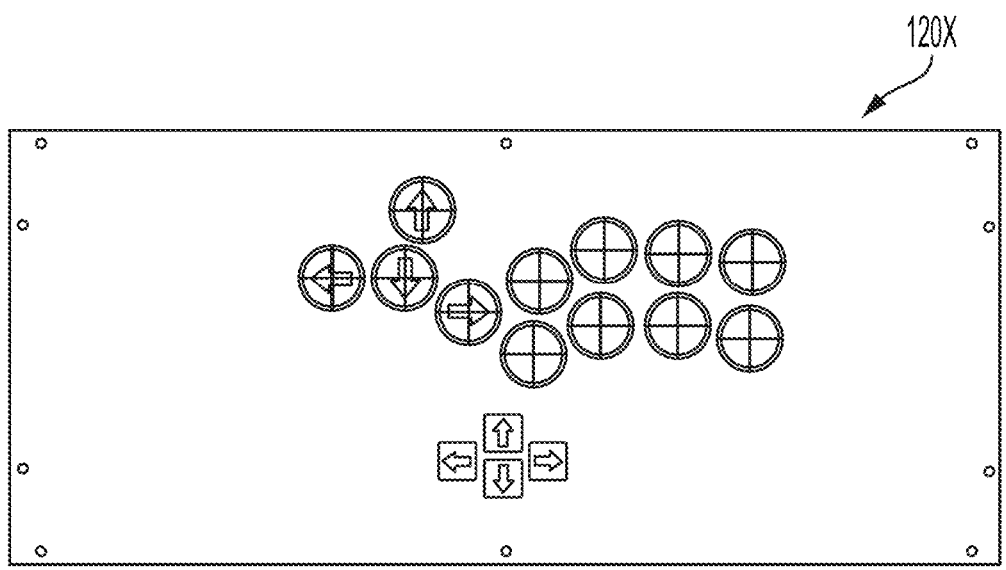
Figure 12A:
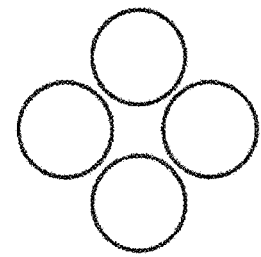
FIGS. 12A through 12I illustrate a series of interchangeable button assemblages.
Figure 12D:
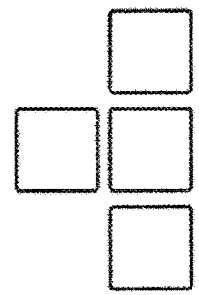
Figure 12G:
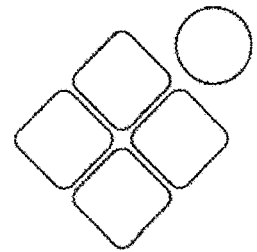
Figure 12B:
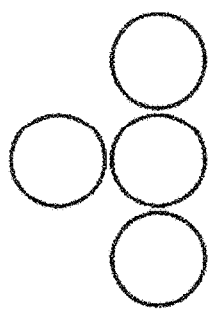
Figure 12E:
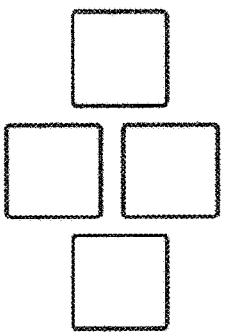
Figure 12H:
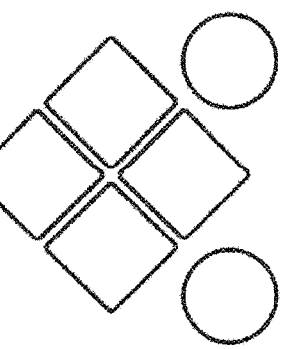
Figure 12C:
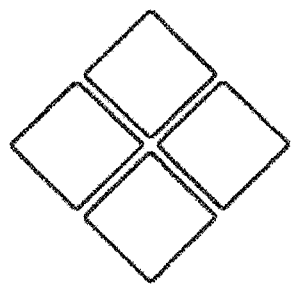
Figure 12F:
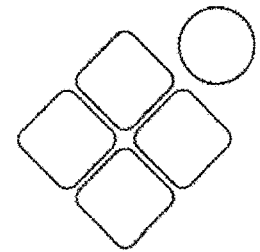
Figure 12I:
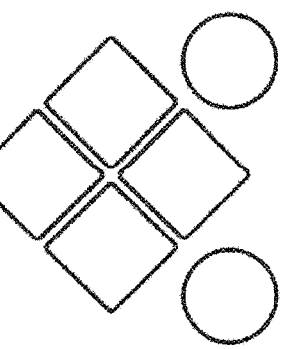

FIG. 11A through FIG. 11W provide various additional configurations of the buttons in accordance with the subject disclosure. It should be appreciated that the example embodiments presented in FIG. 11A through FIG. 11W, are preferably drawn to scale, however, variations of the buttons, gaming controller walls and joysticks in both size and relative placement can vary without departing from the scope of the application. Moreover, relative placement of buttons and joysticks that are claimed are not meant to be limited by configuration, scale, sizes and relative placements in the preferred illustrated arrangements unless otherwise indicated within the claim. In addition, for those arrangements that include a joystick, the joystick can be replaced by any number of movement and modifier buttons as previously described (such as those shown in FIG. 12A through FIG. 12I). Any one of the buttons presented in FIG. 11A through FIG. 11W can be associated with movement, action, trigger, menu, and modifier buttons as previously described unless otherwise claimed. Moreover certain arrangements in FIG. 11A through FIG. 11W include similar button and joystick layout but include the first and second setting switches 190, 192 in other locations i.e., an opposite vertical transverse wall 128, one or both of the longitudinal walls 126, and/or the top surface 122. In addition, any one of the layouts may include a dial in place of or in addition to any of the buttons. The dial changes the modifier button or range of potentiometer values and/or the directional button cardinal values during gameplay by controlling the voltage input associated with button pressing. The variations presented in FIG. 12A through FIG. 12I can be interchanged in the numerous controller layouts. The layout presented in FIG. 11A is similar in size and scale the layout in FIGS. 2A and 2B.

The layouts presented in FIG. 12A through FIG. 12I can be mapped to perform any function, have any value, override, bindings, etc., as described above. However, in one arrangement they have a similar layout to that presented in FIG. 2A. For example, each assemblage of buttons in the upper-right hand corner having a similar arcuate shape to assemblage 134, may include the same functionality, i.e., trigger and action functions. The assemblage of buttons below arcuate-shaped assemblage may include functions similar to the second assemblage 132 presented in FIG. 2A, with four buttons similar to a D-pad. These D-pad buttons are shown as circular, rectangular, square, or diamond shapes. The single button below the assemblage with D-pad functionality may be a modifier similar to the second override button 156 in FIG. 2A. To the left of the horizontal midline HM and above the vertical midline VM is generally either an assemblage of four circular buttons or a joystick, which function similar to the first assemblage of buttons 130 in FIG. 2A. A fifth button located to the left of the four circular buttons described in the previous sentence may be present and function similar to the first override modifier 146 presented in FIG. 2A. To the left of the horizontal midline HM and below the vertical midline VM is another assemblage of typically four closely located buttons that function similarly to the assemblage 136 presented in FIG. 2A. The circular buttons with a smaller radius presented in FIGS. 11R and 11U may have similar functionality to the D-pad. In FIGS. 11M and 11N, the upper three buttons on the upper right side and the lowest button may have D-pad functionality, wherein the joystick is on the left. In FIGS. 11R and 11T the lowest circular button having the smallest radius is optionally present. In FIG. 11V the diagonal buttons (diagonal button assemblages) on both the left and right lower sides may provide various functionality, for example the left diagonal button assemblage may provide a D-pad functionality and the right diagonal button assemblage may provide a right analog stick functionality wherein the small radius circular buttons near each diagonal button assemblage is a modifier for the adjacent assemblage. FIG. 11W provides example functionality symbols of the buttons, wherein the larger arrows are similar to a joystick, i.e., can be combined or pressed in such away for analog readings wherein the smaller arrows may provide D-pad functionality and the arcuate shape is similar in shape and functionality to the third assemblage presented in FIG. 2A. Each D-pad functionality may be designed to be digital (full tilt or no tilt) and each other movement assemblage/joystick may be analog (full tilt, partial tilt, no tilt). Each circular button may be an arcade style circular button, however, the buttons could take other shapes in different embodiments.

Referring back to FIG. 6A, in addition to the afore described SOCD profile settings, the following additional setting options are provided and related to selectable profile data 232: A neutral SOCD is provided that nullifies inputs, for example, D-Pad 'Left' and D-Pad 'Right' simultaneously results in both inputs being nullified; An absolute override SOCD is provided wherein one button always take priority over another, for example, D-Pad 'Down' and D-Pad 'Up' simultaneously results in 'Up' input and nullifies 'Down' input regardless of which input was pressed first; A first input override is provided wherein the first button pressed takes priority, for example, D-Pad 'Left' and D-Pad 'Right' simultaneously results in the second input pressed being nullified; A second input override is provided wherein the second button pressed takes priority, for example, D-Pad 'Left' and D-Pad 'Right' simultaneously results in the first input pressed being nullified. Additional setting options related to selectable profile data 232 include: an exclusively only the first direction (XOR) setting, wherein the first direction is applied regardless of any opposing directional inputs until all directional inputs are released, for example, D-Pad 'Left' held first and D-Pad 'Right' held second will result in the D-Pad 'Right' being nullified until the user is holding neither D-Pad 'Left' nor D-Pad an exclusively only the second direction (Alternate XOR) setting, wherein the second direction is applied regardless of any opposing directional inputs until all directional inputs are released, for example, D-Pad 'Left' held first and D-Pad 'Right' held second will result in the D-Pad 'Left' being nullified until the user is holding neither D-Pad 'Left' or D-Pad 'Right' a second cardinal override once setting, wherein, the second direction overrides the first direction and whereafter the second direction becomes the new first direction when the first direction is released, for example, D-Pad 'Left' is held first and D-Pad 'Right' is held second, D-Pad 'Right' is the second direction and thus the preferred override resulting in the D-Pad 'Left' being nullified and D-Pad 'Right' being sent to the game console and once D-Pad 'Left' is released afterwards while D-Pad 'Right' is still being held down, then D-Pad 'Right' is now designated as the new first direction. Obviously, many of the afore described settings may be selected at once in the same profile.

Still referring back to FIG. 6A, in addition to the afore described SOCD profile settings, the following additional settings related to SOCD resolution with one or more analog inputs are provided and related to selectable profile data 232: a natural analog axis SOCD resolution wherein the resulting movement is the sum of the opposing analog directions (tilt), for example, Voltage A+Voltage B/2 when a potentiometer is used; a neutral analog SOCD, wherein, opposing tilts are nullified regardless of tilt/voltage; and absolute analog override, wherein, one direction always takes priority regardless of which direction is input first; a first analog input setting, wherein, the first direction input takes priority; a second analog input setting, wherein, the second direction input takes priority; a chosen analog input setting, wherein the user will specify which direction will override the other regardless of the input method or input order; an exclusively only the first analog direction, wherein, the first direction is applied regardless of any opposing directional inputs until all directional inputs are released; an exclusively only in the second analog direction, wherein, second direction is applied regardless of any opposing directional inputs until all directional inputs are released; an analog second cardinal overrides once, wherein, second direction overrides the first direction, whereafter, the second direction becomes the new first direction when the first direction is released. The afore described setting can be applied to any types of opposing analog inputs on an axis. Similar settings can include opposing inputs of analog triggers, levers, sensors, mouse, touchpad, actuators, gyroscopic, sensor fusion, and other means. Obviously, many of the afore described settings may be selected at once in the same profile.

In accordance with another aspect of the settings presented in FIG. 6A, non-homogeneous priority SOCD profile settings are provided, the following additional setting options are provided and related to selectable profile data 232: A natural non-homogenous setting, wherein, all outputs from D-Pad, Left Analog Stick, and Right Analog Stick are input with no restrictions or priority; A hard override priority non-homogenous setting, wherein, one or more non-homogenous directional inputs are nullified, for example, D-Pad disables Left Analog Stick entirely when actuated or Left Analog Stick disables D-Pad entirely when actuated or D-Pad disables Right Analog Stick entirely when actuated or Right Analog Stick disables D-Pad entirely when actuated or Left Analog Stick disables Right Analog Stick entirely when actuated or Right Analog Stick disables Left Analog Stick entirely when actuated or Left Analog Stick hard overrides Right Analog Stick and D-Pad or Right Analog Stick hard overrides Left Analog Stick and D-Pad or D-Pad hard overrides Left Analog Stick and Right Analog Stick or Left Analog Stick or D-Pad hard overrides Right Analog Stick or Right Analog Stick or D-Pad hard overrides Left Analog Stick or Left Analog Stick or Right Analog Stick hard overrides D-Pad. Obviously, many of the afore described settings may be selected at once in the same profile.

When two button orientational direction inputs are redundant, one button (cardinal) may nullify the other. For example, if a user inputs 'Left' on D-Pad and 'Left' on Left Analog Stick simultaneously, then a SRCD priority of D-Pad would output only the 'Left' on D-Pad and nullify the 'Left' on Left Analog Stick. Redundant inputs may also result from non-homogenous input sources. In accordance with yet another aspect of the settings presented in FIG. 6A, non-homogenous cross Simultaneous Redundant Cardinal Directions (SRCD) profile settings are provided, the following additional setting options are provided and related to selectable profile data 232: SRCDs prioritize Left Stick and input nullifies D-Pad or SRCDs prioritize Left Stick nullifies Right Stick or SRCDs prioritize D-Pad–Right Stick or SRCDs prioritize D-Pad Left Stick or SRCDs prioritize Right Stick–Left Stick or SRCDs prioritize Right Stick–D-Pad or SRCDs prioritize Left Stick or D-Pad disables Right Stick or SRCDs prioritize Left Stick or Right Stick disables D-Pad or SRCDs prioritize D-Pad or Right Stick disables Left Stick. Obviously, many of the afore described settings may be selected at once in the same profile.

Because of the afore described input mapping redundancies, SOCD conflicts can arise from combining input sources (D-Pad 'Left' and Left Analog Stick 'Right' simultaneously). In-game resolutions for these conflicts may be selected as additional profile data 232: a hybrid setting wherein, certain directional button inputs may be conditionally nullified to resolve SOCD conflicts; A neutral selection setting, wherein, opposite inputs result in nullification of both; an absolute override system, wherein, one direction takes priority regardless of input (analog or digital); A first input override setting, wherein, the first input nullifies a conflicting directional input; A second input override setting, wherein, the second input nullifies a conflicting directional input; An exclusively only the first direction (XOR), wherein, the first direction is applied regardless of any opposing directional inputs until all directional inputs are released; An exclusively only the second direction (XOR) setting, wherein, the second direction is applied regardless of any opposing directional inputs until all directional inputs are released; A second cardinal overrides once setting, wherein, the second direction overrides the first direction, whereafter, the second direction becomes the new first direction when the first direction is released.

In accordance with another aspect of the settings presented in FIG. 6A, D-Pad and right analog stick priority SOCD profile settings are provided, the following additional setting options are provided and related to selectable profile data 232: A neutral setting wherein simultaneous pressing of opposing directions in the D-Pad and right analog nullify both inputs; An absolute override wherein one directional input take priority regardless of if the input is from the D-Pad and left analog; a first input override setting as previously described; A second input override setting as previously described; a chosen direction (absolute) setting as previously described; An exclusively only the first direction (XOR) setting as previously described; An exclusively only the second direction (XOR) setting as previously described; A second cardinal overrides once setting as previously described.

In accordance with another aspect of the settings presented in FIG. 6A, D-Pad and left analog stick priority SOCD profile settings are provided, the following additional setting options are provided and related to selectable profile data 232: A neutral setting wherein simultaneous pressing of opposing directions in the D-Pad and left analog nullify both inputs; An absolute override wherein one directional input take priority regardless of if the input is from the D-Pad and left analog; a first input override setting as previously described; A second input override setting as previously described; a chosen direction (absolute) setting as previously described; An exclusively only the first direction (XOR) setting as previously described; An exclusively only the second direction (XOR) setting as previously described; A second cardinal overrides once setting as previously described.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. Various features that are, for brevity, described in the context of a single embodiment, may also be provided separately or in any sub combination. Further, reference to values stated in ranges includes each and every value within that range. Such variations are not to be regarded as a departure from the disclosure, and all such modifications are intended to be included within the scope of disclosure.

What is claimed is:

1. A gaming controller system comprising:
a gaming controller having a surface including a plurality of buttons corresponding to in-game inputs, wherein the plurality of buttons comprises a first assemblage of buttons and a first modifier button located adjacent to the first assemblage of buttons, wherein the processor is configured to translate the holding of the first modifier button during pressing any of the buttons in the first assemblage of buttons as having a stronger in-game input than if the first modifier button is not held, wherein the first modifier button is separate from the first assemblage of buttons;
a local memory located within the gaming controller and having machine readable non-transitory storage including a profile data that modifies the in-game input; and
a processor located within the gaming controller and configured to read the non-transitory storage in view of the profile data to modify the in-game inputs.

2. The gaming controller system according to claim 1, wherein the profile data includes a plurality of gaming profiles preselected by a user and wherein the processor is further configured to select one of the plurality of gaming profiles.

3. The gaming controller system according to claim 2, wherein each gaming profile includes distinct in-game inputs associated with the plurality of buttons.

4. The gaming controller system according to claim 3, wherein the processor is further configured to select one of the plurality of gaming profiles in game without having to access a menu screen.

5. The gaming controller system according to claim 3, wherein at least two gaming profiles include different preselected simultaneous opposing cardinal direction override protocols.

6. The gaming controller system according to claim 5, wherein at least one of the simultaneous opposing cardinal direction override protocol includes an absolute override setting wherein one in-game input always overrides another opposing in-game input.

7. The gaming controller system according to claim 5, wherein the gaming controller includes at least one joystick and at least one of the simultaneous opposing cardinal direction override protocols includes overriding one of opposing non-joystick inputs and joystick inputs in favor of the other opposing non-joystick inputs and joystick inputs.

8. The gaming controller system according to claim 5, wherein at least one of the simultaneous opposing cardinal direction override protocol includes prioritized in-game input based upon which button is pressed first.

9. The gaming controller system according to claim 2, further including a remote network including additional gaming profiles and the processor is further configured to move the additional gaming profiles to the memory.

10. The gaming controller system according to claim 9, wherein the memory further includes authentication data and the software includes corresponding authentication data that is matched before providing access to the additional gaming profiles in the network.

11. The gaming controller system according to claim 2, wherein the processor is configured to switch between at least two of the gaming profiles with a toggle located on the controller.

12. The gaming controller system according to claim 1, wherein the gaming surface does not include a joystick.

13. The gaming controller system according to claim 1, wherein the plurality of buttons includes a second assemblage of buttons and a second modifier button located adjacent to the second assemblage of buttons, and wherein the processor is configured to translate the holding of the second modifier button during pressing any of the buttons in the second assemblage of buttons as having a stronger in-game input than if the second modifier button is not held.

14. The gaming controller system according to claim 13, wherein each button in the plurality of buttons located on the surface of the gaming controller is a circular arcade style button.

15. A gaming controller system comprising:
a gaming controller having a surface including a plurality of buttons corresponding to in-game inputs;
a local memory located within the gaming controller and having machine readable non-transitory storage including a profile data that modifies the in-game input;

a processor located within the gaming controller and configured to read the non-transitory storage in view of the profile data to modify the in-game inputs;

the plurality of buttons including a first assemblage of buttons and a first modifier button located adjacent to the first assemblage of buttons, and wherein the processor is configured to translate the holding of the first modifier button during pressing any of the buttons in the first assemblage of buttons as having a stronger in-game input than if the first modifier button is not held, wherein the first assemblage of buttons includes a left button, an up button, a right button and a down button, wherein the modifier button is separate from the first assemblage of buttons; and the plurality of buttons further including a second assemblage of buttons and a second modifier button located adjacent to the second assemblage of buttons, and wherein the processor is configured to translate the holding of the second modifier button during pressing any of the buttons in the second assemblage of buttons as having a stronger in-game input than if the second modifier button is not held, wherein the second assemblage of buttons includes a left button, an up button, a right button and a down button, wherein the second modifier button is separate from the second assemblage of buttons.

16. A gaming controller system comprising:

a gaming controller having a surface including a plurality of buttons corresponding to in-game inputs;

a local memory located within the gaming controller and having machine readable non-transitory storage including a profile data that modifies the in-game input;

a processor located within the gaming controller and configured to read the non-transitory storage in view of the profile data to modify the in-game inputs; and wherein the profile data further includes settings for the plurality of buttons corresponding to analog tilt percentage, wherein the plurality of buttons comprises an assemblage of buttons and a modifier button located adjacent to the assemblage of buttons, wherein the modifier button is separate from the assemblage of buttons and modifies the settings of the plurality of buttons corresponding to analog tilt percentage by pressing the modifier button.

17. The gaming controller system of claim 16, wherein the profile data includes a plurality of gaming profiles preselected by a user and wherein the processor is further configured to select one of the plurality of gaming profiles.

18. The gaming controller system of claim 17, wherein the plurality of buttons includes a toggle button for switching between the plurality of gaming profiles.

* * * * *